US010224003B1

(12) United States Patent
Akiyama et al.

(10) Patent No.: US 10,224,003 B1
(45) Date of Patent: Mar. 5, 2019

(54) SWITCHABLE HYBRID GRAPHICS

(71) Applicant: Intel Corporation, Santa Clara, CA (US)

(72) Inventors: James E. Akiyama, Beaverton, OR (US); Sean C. Dardis, Hillsboro, OR (US); Srikanth Kambhatla, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/721,056

(22) Filed: Sep. 29, 2017

(51) Int. Cl.
*G09G 5/36* (2006.01)
*G06T 1/20* (2006.01)
*G09G 5/00* (2006.01)
*G06T 15/00* (2011.01)
*G06F 15/78* (2006.01)

(52) U.S. Cl.
CPC ......... *G09G 5/006* (2013.01); *G06F 15/7839* (2013.01); *G06T 1/20* (2013.01); *G06T 15/005* (2013.01); *G06T 2200/04* (2013.01); *G06T 2200/24* (2013.01); *G09G 2330/026* (2013.01); *G09G 2354/00* (2013.01); *G09G 2360/08* (2013.01); *G09G 2370/08* (2013.01)

(58) Field of Classification Search
CPC ..... G06T 1/20; G09G 5/363; G09G 2330/026
USPC ................................................ 345/501, 502
See application file for complete search history.

(56) References Cited

U.S. PATENT DOCUMENTS

| | | | | |
|---|---|---|---|---|
| 7,698,579 B2* | 4/2010 | Hendry | ................. | G06F 1/3218 345/502 |
| 8,199,155 B2* | 6/2012 | Leroy | ................... | G06F 1/3203 345/502 |
| 8,243,082 B1* | 8/2012 | Wyatt | ................... | G06F 3/1438 345/502 |
| 8,259,119 B1* | 9/2012 | Diard | .................... | G06F 9/4856 345/502 |
| 8,810,586 B2* | 8/2014 | Sudo | ........................ | G06F 3/14 345/502 |
| 9,064,322 B1* | 6/2015 | Wyatt | ....................... | G06T 1/20 |
| 2008/0030509 A1* | 2/2008 | Conroy | .................... | G09G 5/12 345/502 |
| 2010/0091025 A1* | 4/2010 | Nugent | .................. | G09G 5/363 345/502 |
| 2010/0220101 A1* | 9/2010 | Wyatt | ....................... | G06F 3/14 345/502 |
| 2010/0220102 A1* | 9/2010 | Wyatt | ................... | G06F 3/1438 345/502 |
| 2011/0025696 A1* | 2/2011 | Wyatt | ................... | G09G 5/363 345/502 |
| 2011/0267359 A1* | 11/2011 | Redman | ................ | G06F 3/1438 345/502 |
| 2013/0141442 A1* | 6/2013 | Brothers | ............. | H01L 25/0657 345/502 |

* cited by examiner

*Primary Examiner* — Jacinta M Crawford
(74) *Attorney, Agent, or Firm* — Jordan IP Law, LLC

(57) ABSTRACT

Systems, apparatuses and methods may provide for technology that based on information from a connected display device, forms a determination whether to connect a discrete graphics processor or an integrated graphics processor to the connected display device, the information corresponding to whether the connected display device is to be driven by the integrated graphics processor or the discrete graphics processor.

26 Claims, 29 Drawing Sheets

FIG. 20A GRAPHICS PROCESSOR COMMAND FORMAT 900
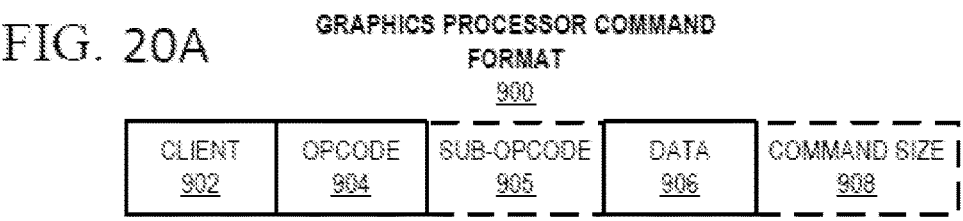
FIG. 20B GRAPHICS PROCESSOR COMMAND SEQUENCE 910
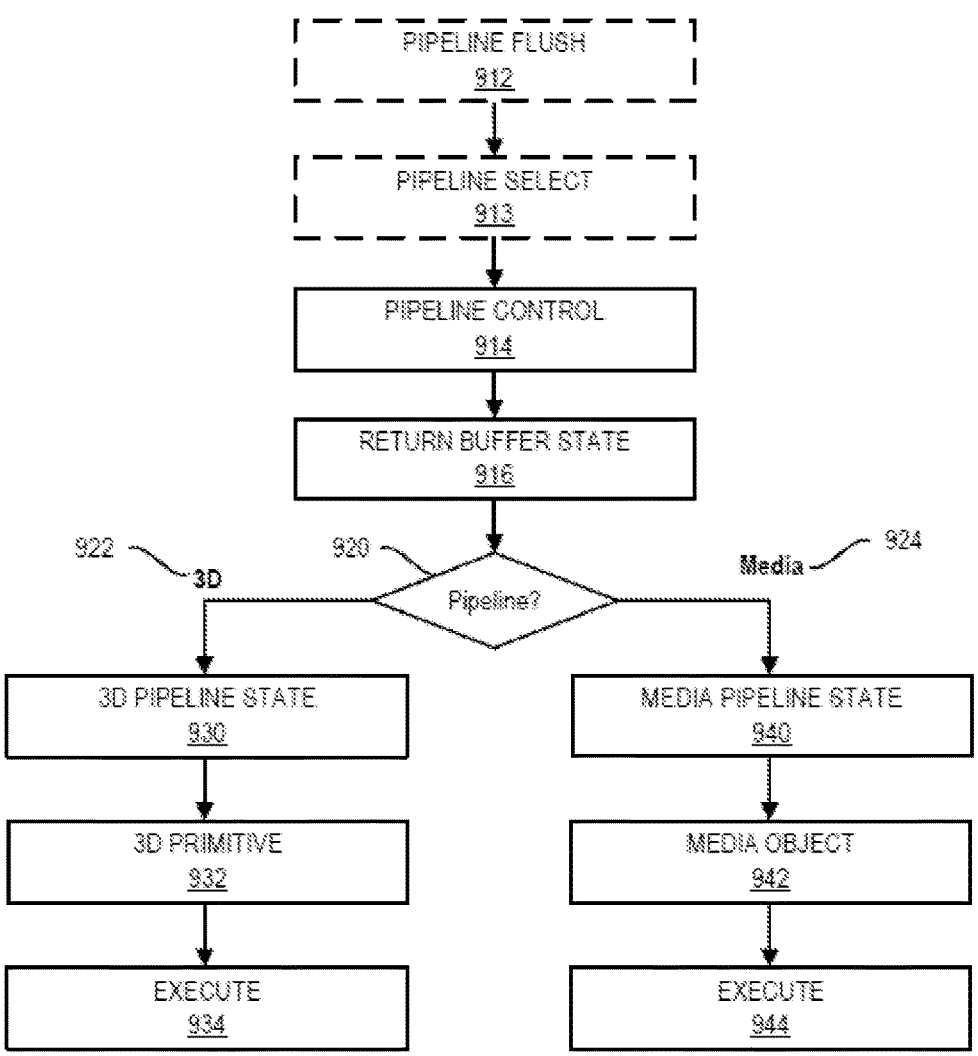

SWITCHABLE HYBRID GRAPHICS

BACKGROUND

Embodiments generally relate to graphics processors such as, for example, an integrated graphics processor and/or a discrete graphics processor. Different display devices may require the use of different graphics processors depending upon requirements. For example, head mounted display (HMD) systems may be used in virtual reality (VR) and augmented reality (AR) applications to present visual content to the wearer in a wide variety of settings (e.g., immersive games and/or entertainment). A typical HMD may include a display that visually presents an image. In order to render content to the display, image data may be processed. More particularly, game applications may use hardware-accelerated graphics application programming interfaces (APIs) to leverage the capabilities of the discrete graphics processor, wherein this leveraging can include offloading graphical and non-graphical computation to the discrete graphics processor in order to maintain interactive frame rates.

BRIEF DESCRIPTION OF THE DRAWINGS

The various advantages of the embodiments will become apparent to one skilled in the art by reading the following specification and appended claims, and by referencing the following drawings, in which:

FIGS. 20A-20B are block diagrams of examples of graphics processor programming according to an embodiment;

DETAILED DESCRIPTION

Figure 1:
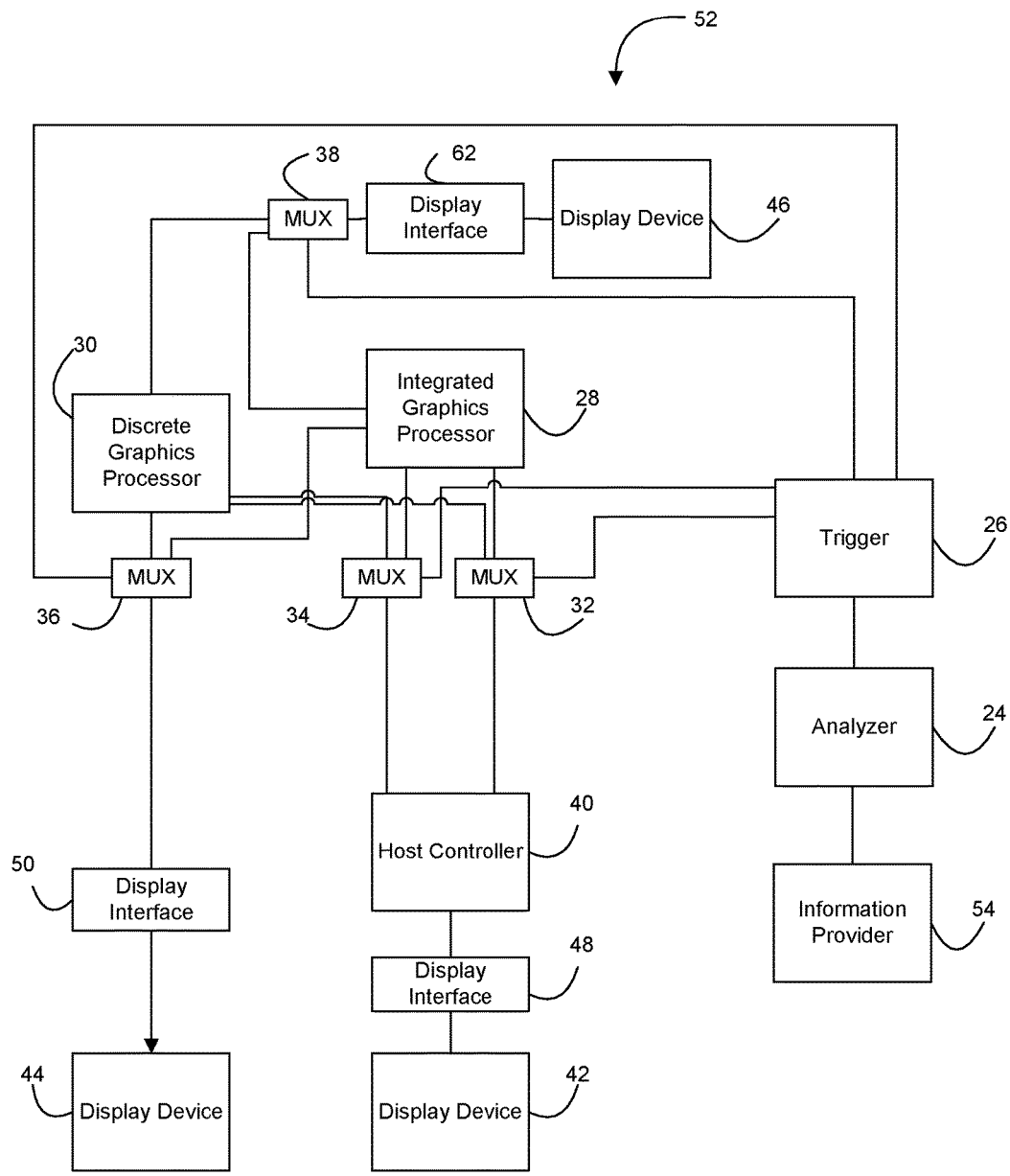
FIG. 1 is an illustration of an example of a computing architecture according to an embodiment.

FIG. 1 illustrates a computing architecture 52. The illustrated computing architecture 52 includes an integrated graphics processor 28 and a discrete graphics processor 30, which may also be referred to as a dedicated graphics card or dedicated graphics processor. The integrated graphics processor 28 and the discrete graphics processor 30 may be part of a computing system or computing device such as, for example, a server, desktop computer, notebook computer, tablet computer, convertible tablet, smart phone, personal digital assistant (PDA), mobile Internet device (MID), wearable device, media player, etc., or any combination thereof.

The computing architecture 52 may include MUXs 32, 34, 36, 38. Each of the MUXs 32, 34, 36, 38 may have signal lines (e.g., inputs) that are connected to both the integrated graphics processor 28 and the discrete graphics processor 30. The MUXs 32, 34, 36, 38 may be controlled to output signals either from the integrated graphics processor 28 or the discrete graphics processor 30. The illustrated MUXs 32, 34, 36, 38 are connected to display devices 42, 44, 46 via display interfaces 48, 50, 62 so that outputs of the MUXs 32, 34, 36, 38 are provided to the display devices 42, 44, 46 via the display interfaces 48, 50, 62. Such a connection may allow for two-way communication between the integrated graphics processor 28 and the display devices 42, 44, 46, as well as between the discrete graphics processor 30 and the display devices 42, 44, 46 depending upon a selection of the MUXs 32, 34, 36, 38. Therefore, the MUXs 32, 34, 36, 38 may electrically selectively connect the integrated graphics processor 28 and the discrete graphics processor 30 to the display devices 42, 44, 46 to enable information to be passed between the integrated graphics processor 28 and the display devices 42, 44, 46, as well as between the discrete graphics processor 30 and the display devices 42, 44, 46.

For example, if the discrete graphics processor 30 is electrically connected to the output of the MUX 36, then the discrete graphics processor 30 may receive information from the display device 44 and provide information to the display device 44, while the integrated graphics processor 28 is electrically disconnected from the display device 44. A host controller 40 (e.g., chipset) may also control a connection to a Universal Serial Bus (USB) type C connector for example. The host controller 40 may be connected to the display interface 48, which connects to the illustrated display device 42. The display devices 42, 44, 46 may be different display devices that are connected to or part of the computing system. For example, the display device 42 may be an HMD, the display device 44 may be a high-definition primary display, and the display device 46 may be an internal monitor (e.g., a laptop monitor) of the computing system.

The illustrated computing architecture 52 includes an information provider 54 (e.g., logic instructions, configurable logic, fixed-functionality hardware logic, etc., or any combination thereof), an analyzer 24 (e.g., logic instructions, configurable logic, fixed-functionality hardware logic, etc., or any combination thereof) and a trigger 26 (e.g., logic instructions, configurable logic, fixed-functionality hardware logic, etc., or any combination thereof), which may be collectively referred to as "logic." The information provider 54, the analyzer 24 and the trigger 26 may make a determination as to whether each of the display devices 42, 44, 46 is driven by the integrated graphics processor 28 or the discrete graphics processor 30, and individually control the MUXs 32, 34, 36, 38 to each output a respective one of integrated graphics processor 28 outputs and discrete graphics processor 30 outputs in accordance with the determination. Doing so may reduce the total motion-to-photon (M2P) latency as well as reduce memory errors that may result in blue screens being displayed by the display devices 42, 44, 46. The trigger 26 and/or the information provider 54 may suppress information (e.g., ASL information) relating to modifying of the MUXs 32, 34, 36, 38 so that the MUXs' 32, 34, 36, 38 are not modified by other elements.

For example, during a boot sequence of the computing system (or upon connection of the display device 42 to the computing system) and based upon information from the display device 42, the information provider 54 (e.g., logic instructions, configurable logic, fixed-functionality hardware logic, etc., or any combination thereof), the analyzer 24 and the trigger 26 may operate together (described below) to make a determination and selectively control MUXs 32, 34 to electrically connect the integrated graphics processor 28 or the discrete graphics processor 30 to the display device 42. The information may include, for example, the Extended Display Identification Data (EDID) of the display device 42. Likewise, the information provider 54, the analyzer 24 and the trigger 26 may control the MUXs 36, 38 to electrically connect the integrated graphics processor 28 or the discrete graphics processor 30 to the display devices 44, 46.

In contrast, the M2P is greater in a situation in which a discrete graphics processor provides information (e.g., frames) to an integrated graphics processor, which in turn provides the information to a display device. Reducing the total M2P latency to under 20 milliseconds may enhance the user experience by reducing judder and providing an immersive experience. Such a memory copy operation, however, may increase the M2P latency to an unacceptable level.

Furthermore, switching between an integrated graphics processor and discrete graphics processor after an application has begun to operate with a display device, may result in errors. For example, the integrated graphics processor may use a memory that is different from that of the discrete graphics processor. The application may, however, continue to write to the integrated graphics processor memory after such a switch, which results in a memory error, and a blue screen may be displayed. Thus, errors may occur when deciding whether content of an application (e.g., whether the application may utilize heavy graphical usage) may utilize a discrete graphics processor output or integrated graphics processor output is provided to a display device, since memory copies and switching may be involved during such a process.

Some digital rights management based media may specify the use of a single controller such as, for example, the integrated graphics controller 28, for all display devices for seamless playback. Thus, if different display interfaces are permanently hardwired to different ones of the integrated graphics processor 28 and the discrete graphics processor 30, the digital rights management based media may not operate seamlessly. In contrast, the above hybrid switching may enable each of the display devices 42, 44, 46 to be mapped to an integrated graphics driver of the integrated graphics processor 28, and also reduce battery consumption since switching is enabled between the discrete graphics processor 30 and the integrated graphics processor 28.

The discrete graphics processor 30 may be a higher-performance graphics processor than the integrated graphics processor 28. For example, the discrete graphics processor 30 may have a dedicated random access memory (RAM) and may not need use of RAM of a central processing unit. Furthermore, the discrete graphics processor 30 may include a dedicated cooling system, and have a higher parallel processing ability than the integrated graphics processor 28. In contrast, the integrated graphics processor 28 may share resources (e.g., RAM) with a central processing unit and have less parallel processing ability than the discrete graphics processor 30. The integrated graphics processor 28, however, may use less power than the discrete graphics processor 30. The integrated graphics processor 28 may be integrated into a motherboard or the central processing unit. In contrast, the discrete graphics processor 30 may be connected to the motherboard, but may not be integrated with the motherboard and is separable from the motherboard. Thus, the integrated graphics processor 28 and the discrete graphics processor 30 may be utilized in different situations.

The MUXs 32, 34, 36, 38 may be set to a hybrid state or mode. The hybrid state may allow individual switching of each of the MUXs 32, 34, 36, 38, so that each of the MUXs 32, 34, 36, 38 switch between outputting an output of the integrated graphics processor 28 and an output of the discrete graphics processor 30. Accordingly, the MUX 32 may output a first output of the discrete graphics processor 30, the MUX 34 may output a second output of the discrete graphics processor 30, the MUX 36 may output a first output of the integrated graphics processor 28 and the MUX 38 may output a second output of the integrated graphics processor 28. As noted, the MUXs 32, 34, 36, 38 allow for two-way communication. In the hybrid state, the MUXs 32, 34, 36, 38 may by default, unless otherwise changed, connect the integrated graphics processor 30 to the display devices 42, 44, 46. For example, the MUXs 32, 34, 36, 38 may electrically connect the integrated graphics processor 30 to each of the display devices 42, 44, 46.

The hybrid state, however, may be overridden by the user. For example, the user may override the hybrid state to control at least one of the MUXs 32, 34, 36, 38 to always electrically connect the discrete graphics processor 30, or the integrated graphics processor 28 a respective display device 42, 44, 46. For example, the user may override the hybrid state through a BIOS boot option, so that the MUXs 32, 34 always output discrete graphics processor 30 outputs.

As already noted, the information provider 54, the analyzer 24 and the trigger 26 may be implemented in one or more modules as a set of logic instructions stored in a machine- or computer-readable storage medium such as random access memory (RAM), read only memory (ROM), programmable ROM (PROM), flash memory, etc., as configurable logic such as, for example, programmable logic arrays (PLAs), field programmable gate arrays (FPGAs), complex programmable logic devices (CPLDs), as fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations of the information provider 54, the analyzer 24 and the trigger 26 may be written in any combination of one or more programming languages, including an object oriented programming language such as C++ or the like and conventional procedural programming languages, such as the "C" programming language or similar programming languages. Moreover, the information provider 54, the analyzer 24 and the trigger 26 may be implemented using any of the herein mentioned circuit technologies. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

The information provider 54, which may be firmware such as a Basic Input/Output System (BIOS), may include provider information. For example, the provider information may include information about one or more of devices which may preferably operate with the discrete graphics processor 30, the computing architecture 52 itself and how to set the MUXs 32, 34, 36, 38, information set by the user corresponding to whether the user prefers to use the discrete graphics processor 30 or the integrated graphics processor 28, or one or more devices which may preferably operate with the integrated graphics processor 28. The provider information may further include information about a correspondence between types of connected display devices and outputs of the MUXs 32, 34, 36, 38. For example, the provider information may include data indicating that the discrete graphics processor 30 should be electrically connected to a display device if the display device is an HMD or a graphics intensive display device, and how to set the MUXs 32, 34, 36, 38 to achieve the desired electrical connections. The information provider 54 may provide the provider information to the analyzer 24. For example, the information provider 54 (e.g., BIOS) may communicate with the analyzer 24 through an Advanced Configuration and Power Interface (ACPI) specification.

The analyzer 24 may detect whether a display is connected to the computing system, and receive display information (e.g., Extended Display Identification Data) from the display to make a determination whether each of the display devices 42, 44, 46 are to be electrically connected to the integrated graphics processor 28 or the discrete graphics processor 30. In some embodiments, the analyzer 24 may receive the display information and detect the display based upon information from a microcontroller or an integrated graphics processor driver of the integrated graphics processor 28.

In some embodiments, the integrated graphics processor driver may detect the display, which may initially be connected to the integrated graphics processor 28. For example, the analyzer 24 may determine that that the display device 42 is connected, and then the analyzer 24 may make a determination, from the provider information and the display information (e.g., EDID) of the display device 42, whether the MUXs 32, 34 are to output the discrete graphics processor 30 outputs, or the integrated graphics processor 28 outputs. For example, the analyzer 24 may determine that the MUXs 32, 34 are to be set to connect the discrete graphics processor 30 to the display device 42 when the display device 42 is a graphics intensive display device, such as an HMD. In some embodiments, the analyzer 24 may compare the display information to the provider information to determine whether the MUXs 32, 34 are to be set to output the discrete graphics processor 30 outputs or the integrated graphics processor 28 outputs. In some embodiments, the analyzer 24 may be the integrated graphics processor driver.

The analyzer 24 may provide the determination to the trigger 26 (e.g., BIOS, microcontroller, integrated graphics driver of the integrated graphics processor 28, a device driver or firmware). For example, the trigger 26 may control the MUXs 32, 34 to reflect the determination of the analyzer 24. In some embodiments, the trigger 26 may control the MUXs 32, 34 based upon the provider information of the information provider 54 and the determination of the analyzer 24. For example, the provider information may include information relating to how MUXs 32, 34 are able to be controlled, through for example general-purpose input/output (GPIO) pins. The trigger 26 may set the GPIO pins to provide appropriate voltages to the MUXs 32, 34 to reflect the determination. The provider information may include different ways for the trigger 26 to control the GPIO pins, for example by writing into specific memory or another mechanism, or by utilizing firmware. While the display device 42 and MUXs 32, 24 are discussed above, the MUXs 36, 38 may be similarly set based upon configurations of the display device 44, 46 respectively.

In some embodiments, the integrated graphics driver of the integrated graphics processor 28 may include at least one of the information provider 54 and the analyzer 24. That is, the integrated graphics driver may include both the information provider 54 and the analyzer 24.

For example, to operate as the information provider 54, integrated graphics driver may include a "white list" of display devices, which are to operate with the discrete graphics processor 30. Upon detecting and in direct response to the display device 42 being connected to the integrated graphics processor 30, the integrated graphics driver will detect and receive information (e.g., EDID) from the display device 42. The integrated graphics driver may operate as the analyzer 24 to compare the information against the white list. If the display device 42 is in the list, the integrated graphics driver will make a decision that the display device 42 should be connected to the discrete graphics processor 30. The integrated graphics driver may then provide the decision to the trigger 26. The trigger 26 may be for example, a firmware such as the BIOS. The firmware may control the MUXs 32, 34, for example by writing into memory, to provide the discrete graphics processor 30 outputs to the display device 42. In some embodiments, the trigger 26 (e.g., firmware) may control another device, such as the integrated graphics processor 28, which in turn controls the MUXs 32, 34 through select lines of the MUXs 32, 34. In some embodiments, the trigger 26 may control GPIOs to control the MUXs 32, 34. For example, the trigger 26 may write into specific memory to change the GPIOs to control the MUXs 32, 34. The other MUXs 36, 38 and display devices 44, 46 may be similarly be driven and controlled as described above.

In some embodiments, a microcontroller of the integrated graphics processor 28 may be manipulated by the trigger 26, with outputs of the integrated graphics processor 28 provided to the select lines of the MUXs 32, 34, 36, 38. In some embodiments, a driver of the host controller 40 may be the information provider 54 and the analyzer 24. Thus, various implementations of the information provider 54, the analyzer 24 and the trigger 26 are possible.

In some embodiments, the MUXs 32, 34 may provide different outputs based upon whether more than one display device is connected to the computing system through the host controller 40. For example, the MUX 32 may output the discrete graphics processor 30 output and the MUX 34 may output the integrated graphics processor 28 output.

In some embodiments, a discrete graphics driver of the discrete graphics processor 30 may be the analyzer 24. For example, if through the above hybrid switching, the display device 42 is connected to the discrete graphics processor 30, the discrete graphics driver may monitor the display interface 48 (e.g., a port of the computing system) to which the display device 42 is connected. The discrete graphics driver may detect if the display device 42 is disconnected from the display interface 48. The discrete graphics driver may then determine that the MUXs 32, 34 should be reset to connect the integrated graphics processor 28 to the output of the MUXs 32, 34. The trigger 26, which may be the BIOS or the discrete graphics driver, may then reset the MUXs 32, 34 to connect the integrated graphics processor 28 to the outputs of the MUXs 32, 34. The integrated graphics driver may then monitor the display interface 48 to determine if another display device is connected to the display interface 48.

In some embodiments, the hybrid state of the MUXs 32, 34, 36, 38 may be overridden by the user. For example, the user may override the hybrid state to always enable the discrete graphics processor 30 output, or the integrated graphics processor 28 output, to be output by at least one of the MUXs 32, 34, 36, 38. For example, the user may override the hybrid state through a BIOS boot option, so that the MUXs 32, 34 always output discrete graphics processor 30 outputs. In such a situation, the analyzer 24 (e.g., BIOS) may suppress communication (e.g., ASL communication of the MUXs 32, 34 port information) to drivers (e.g., the integrated graphics driver and discrete graphics driver), to effectively disable the ability for other elements to switch outputs of the MUXs 32, 34. The trigger 26 (e.g., BIOS) would also control the MUXs 32, 34 to output the discrete graphics processor 30 outputs.

Figure 2:
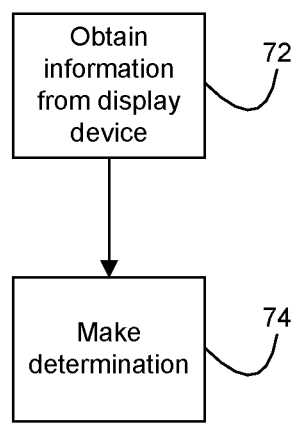
FIGS. 2-3 are flowcharts of examples of methods of operating a computing architecture according to embodiments.

FIG. 2 shows a method 70 of operating a semiconductor package apparatus to achieve hybrid switching. The method 70 may be implemented in one or more modules as a set of logic instructions stored in a machine- or computer-readable storage medium such as RAM, ROM, PROM, flash memory, etc., as configurable logic such as, for example, PLAs, FPGAs, CPLDs, as fixed-functionality logic hardware using circuit technology such as, for example, ASIC, CMOS or TTL technology, or any combination thereof.

In processing block 72, logic which is coupled to a substrate, may obtain information from a connected display device. The information may correspond to whether the connected display device is to operate with an integrated graphics processor or a discrete graphics processor. In block 74, the logic forms a determination whether to connect the discrete graphics processor or the integrated graphics processor to the connected display device. The logic may make the determination based upon the information. The logic may include the information provider, the analyzer and the trigger as described above.

Figure 3:
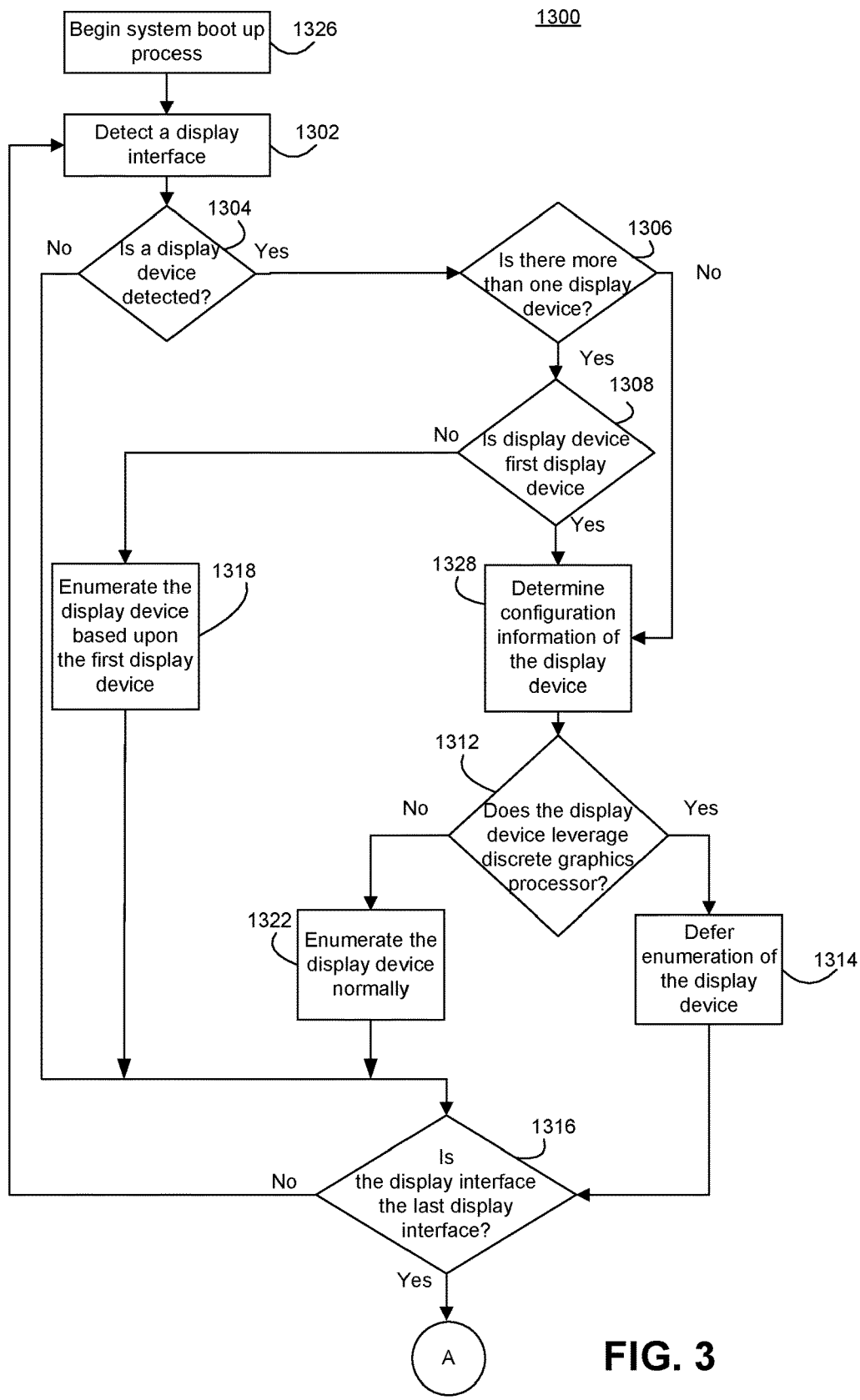

FIG. 3 shows a method 1300 of hybrid switching. As noted in block 1326, the method 1300 may occur during a boot-up process of a computing system (or a pre-operating system initialization) which includes an integrated graphics processor. That is, each of steps 1302-1326 may occur during a boot up or wake up process of the computing system. A connected display device may be connected to the computing system.

Furthermore, the method 1300 may be implemented in one or more modules as a set of logic instructions stored in a machine- or computer-readable storage medium such as RAM, ROM, PROM, flash memory, etc., as configurable logic such as, for example, PLAs, FPGAs, CPLDs, as fixed-functionality logic hardware using circuit technology such as, for example, ASIC, CMOS or TTL technology, or any combination thereof.

In block 1326, the boot process is initialized. In block 1302, a display interface is detected. If the computing system has several display interfaces, the display interfaces are detected in order. In the illustrated example, a determination may be made by block 1304, whether a display device is detected at the display interface. For example, if a voltage is detected on a Hot Plug Detect (HPD) pin connected to the display interface, then a display device is connected to the display interface. If no display device is detected, then block 1316 may determine whether the display interface is the last display interface of the computing system. If not, the next display interface is detected by block 1302.

If in block 1304, a display device is detected, the method 1300 may proceed to block 1306. In block 1306, a determination may be made as to whether multiple display devices are connected together and connected to the display interface. For example, Multi-Stream Transport may be available on daisy chained display devices, with one device connected to the display interface. If multiple devices are detected, block 1308 may determine if the display device detected in block 1304 is the first one of the multiple display devices to be detected, or the first device in the daisy chain. If not, the display device may be enumerated based upon the first display device of the multiple display devices in block 1318. For example, the display device may be displayed based upon the setting (e.g., whether to receive the output of the discrete graphics processor or integrated graphics processor) of the first display device out of the multiple display devices. This may result in the integrated graphics processor "seeing" an unplug even while the discrete graphics processor sees a "plug event." Furthermore, the associated MUX may not be changed. Enumerate may also include allowing a device driver (e.g., the integrated graphics processor driver or the discrete graphics processor driver) to drive the display device to display images.

If in block 1308, it is determined that the display device is the first display device, in block 1328 configuration information of the display device is determined. For example, information (e.g., EDID) of the display device may be obtained and retrieved from the display device. In block 1312, a determination is made from the configuration information, whether the display device should leverage the discrete graphics processor. For example, if the configuration information indicates that the display device is an HMD, it may be determined that the display device will leverage the discrete graphics processor. The information of the display device may be compared against other information (e.g., a white list) to determine if the display device should leverage the discrete graphics processor. If the display device does leverage the discrete graphics processor, then in block 1314, enumeration, such as displaying of the display device and allowing some applications of the operating system to access the display device, is deferred and identifying information of the display interface may be stored.

The enumeration of the display device is deferred in case a discrete graphics driver of the discrete graphics processor is not yet initialized. For example, during a boot operation, drivers, including the discrete graphics driver, may not yet be initialized. Thus, enumeration of the display device may be delayed until the discrete graphics driver is determined to be available. The method 1300 may proceed to block 1316, which may determine whether the display interface is the last display interface of the computing system. If so, in illustrated circle A, the method 1300 may be continued as described with respect to FIG. 4.

If in block 1312, the display device does not leverage the discrete graphics processor, then the display device is enumerated normally in block 1322, for example, by operating the display with the integrated graphics processor, modifying a MUX to electrically connect the integrated graphics processor to the display device, notifying the operating system, when initialized, that the display device is available, or utilizing a display device driver of the display device to operate the display. The method 1300 proceeds to block 1316 from block 1322, and similarly to as discussed above.

Figure 4:
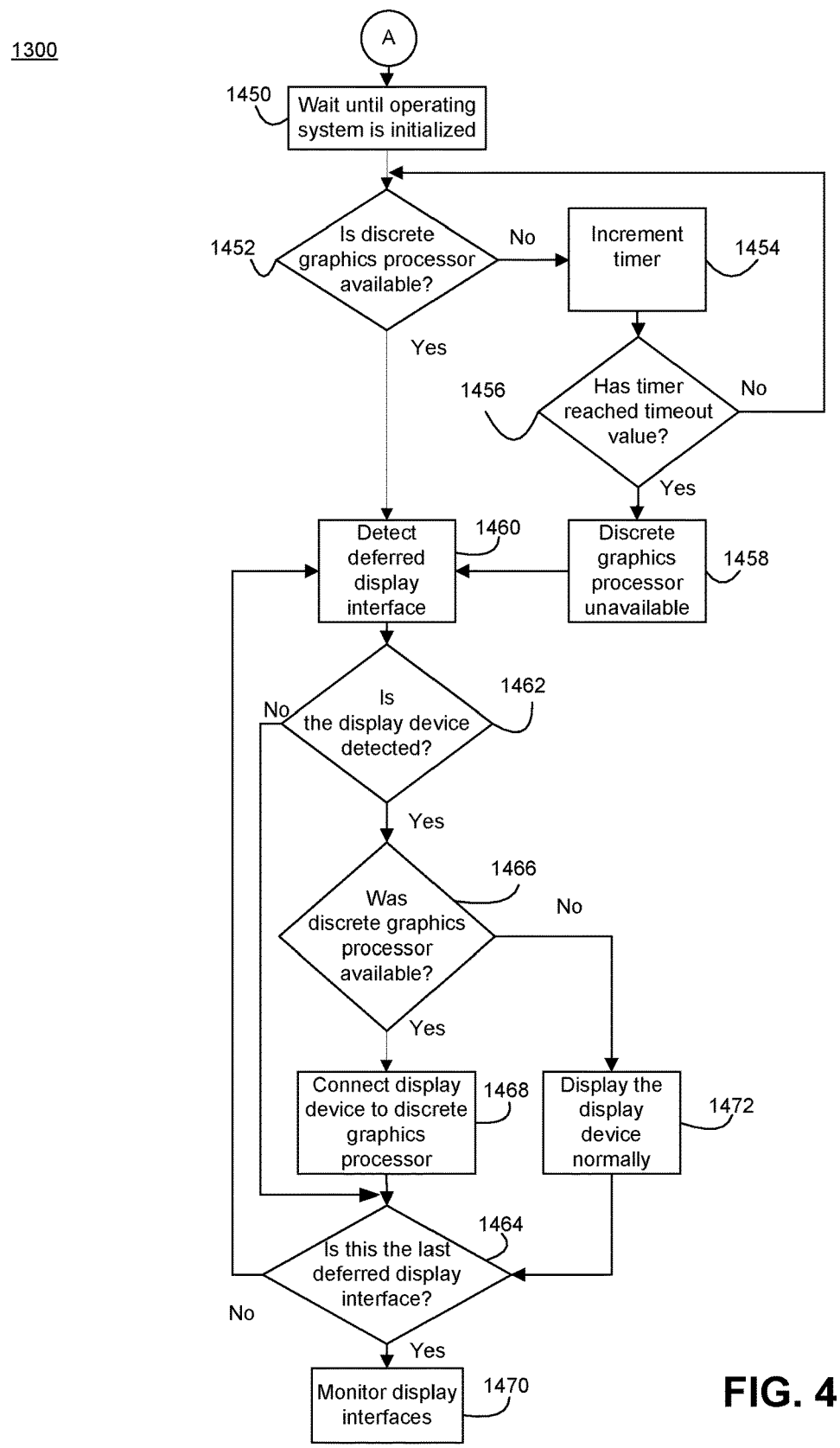
FIG. 4 is a continuation of the flowchart of FIG. 3.

FIG. 4 illustrates the continuation of method 1300. Each of blocks 1452-1472 may occur after the boot process is completed and when the operating system is initialized.

In block 1450, the operating system is initialized. In block 1452, it is determined whether the discrete graphics processor is ready. For example, if the discrete graphics processor driver is available, the discrete graphics processor may also be available. If the discrete graphics processor is not yet ready, in illustrated block 1454, a timer is incremented. ASL information of how to control the MUXs may be suppressed as well until the discrete graphics processor is available. Block 1456 determines whether the timer has reached a timeout value. The timeout value may be set to reflect the probability of the discrete graphics processor becoming available. For example, if the discrete graphics processor was available in prior instances (e.g., another time the user utilized the computing system), the timeout value may be higher since the confidence of the discrete graphics processor becoming available may be high. However, if the discrete graphics processor was previously unavailable in prior instances (e.g., prior operations of the computing device), then the timeout value may be lower because it is more likely that the discrete graphics processor will continue to be unavailable. Therefore, the timer may be adjusted, by setting the timer value high, to reflect whether software (e.g., discrete graphics processor driver) associated with the discrete graphics processor is still being initialized. In contrast, if it is likely that the discrete graphics processor itself is missing, the timer value may be set to a lower value. If the timeout value has not been reached, illustrated block 1402 is repeated and it is again determined if the discrete graphics processor is available.

If in block 1456 the timer has reached the timeout value, the display graphics processor is determined to be unavailable in block 1458. The method 1300 may then proceed to block 1460. In some embodiments, in block 1458 a prompt may also be displayed to the user to indicate that the discrete graphics processor is unavailable.

If in block 1452, the discrete graphics processor is available, in block 1460 a deferred display interface, which corresponds to one of the deferred display devices, is detected. The deferred display device corresponds to the display device which was determined in block 1312 to leverage the discrete graphics processor. The deferred display interface may be determined from the identifying information of the display interface stored in block 1314. Block 1460 determines if the deferred display device is still connected to the deferred display interface. For example, a voltage on an HPD may be received if the deferred display device is still connected to the display interface. If no display device is detected, then illustrated block 1464 determines whether the current deferred display interface is the last deferred display interface. If so, block 1470 may monitor the display interfaces. If in block 1464, the current deferred display interface is not the last deferred display interface, illustrated block 1410 detects the next deferred display interface.

If in block 1462 the deferred display device is detected, block 1466 determines whether the discrete graphics processor was available at block 1452. If the discrete graphics processor was available, then block 1468 may electrically connect the discrete graphics processor to the display device. For example, a MUX, which receives outputs of both the discrete graphics processor and the integrated graphics processor, may be controlled to provide the discrete graphics processor output to the display device.

If in block 1466 it is determined that the discrete graphics processor was unavailable, then in block 1472 the integrated graphics processor may be electrically connected to the display device. For example, a MUX, which receives outputs of both the discrete graphics processor and the integrated graphics processor, may be controlled to provide the integrated graphics processor output to the display device. If the discrete graphics processor is unavailable, these deferred display devices may be connected to the output of the integrated graphics processor to avoid error states.

After blocks 1468, 1472, the method 1300 moves to block 1464, as discussed above. The above method 1300 may be implemented by the integrated graphics driver. The above method 1300 may be implemented by the logic (e.g., the analyzer, the information provider and the trigger).

Figure 5:
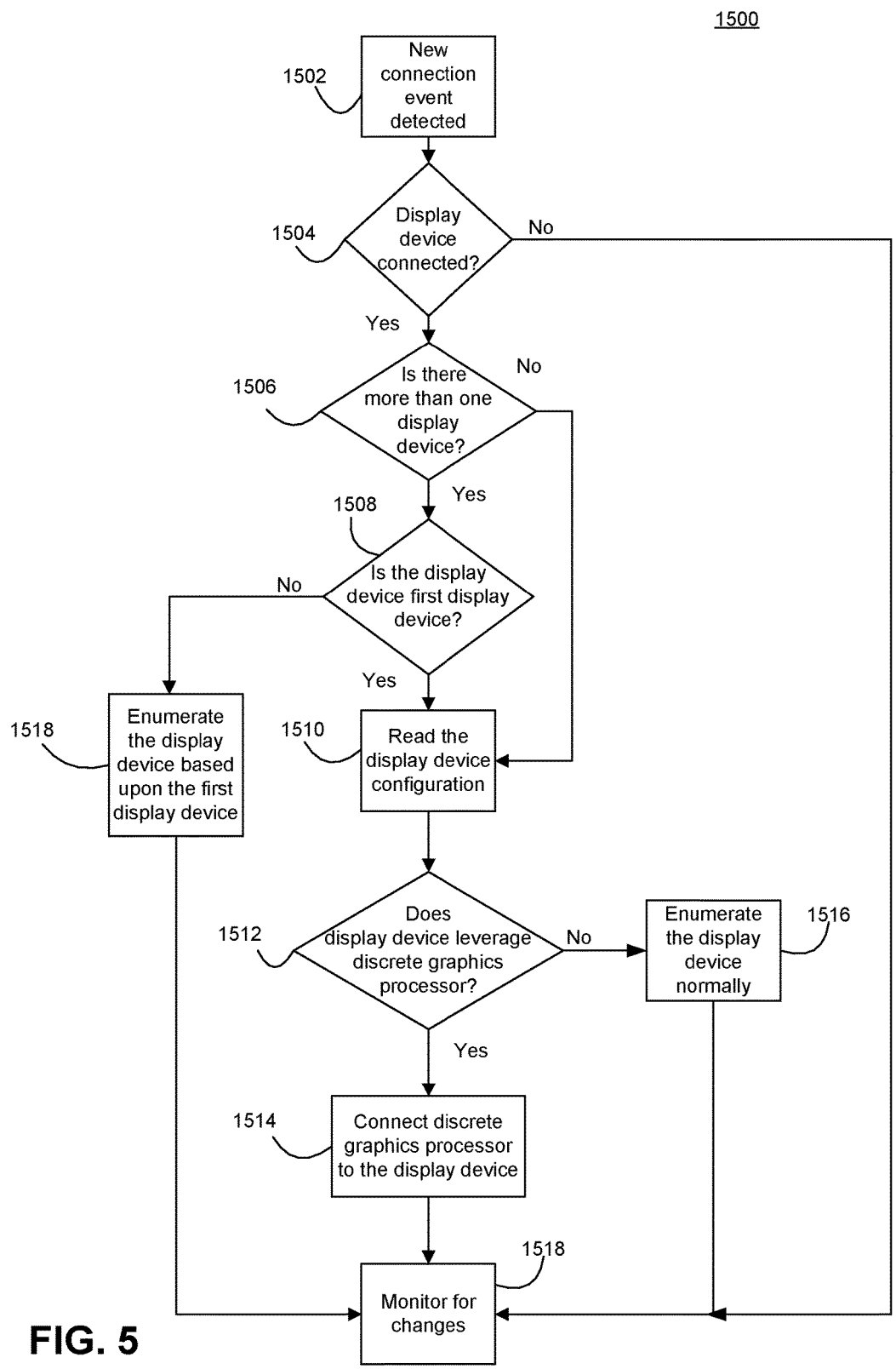
FIGS. 5-10 are additional flowcharts of examples of method of operating computing architectures according to embodiments.

FIG. 5 illustrates a method 1500 of hybrid switching. Method 1500 may occur after a boot up or wake up sequence is completed and when the operating system is initialized.

The method 1500 may be implemented in one or more modules as a set of logic instructions stored in a machine- or computer-readable storage medium such as RAM, ROM, PROM, flash memory, etc., as configurable logic such as, for example, PLAs, FPGAs, CPLDs, as fixed-functionality logic hardware using circuit technology such as, for example, ASIC, CMOS or TTL technology, or any combination thereof.

In block 1502, a new connection event is detected. This event may be indicative of a previously unconnected device being connected to a computing system through a display interface. In block 1504, the display device may be verified as being connected. For example, if a voltage is detected on a HPD pin connected to the display interface, then the display device may be connected to the display interface.

Block 1506 makes a determination as to whether multiple display devices are connected together and connected to the display interface. For example, Multi-Stream Transport may be available on daisy chained display devices, with one device connected to the display interface. If multiple devices are not detected, the method may proceed to block 1510, which is discussed below.

If multiple devices are detected, block 1508 may determine if the display device detected in block 1504 is the first display device out of the multiple display devices to be detected. If not, the display device may be enumerated or displayed based upon the first display device in block 1518, and based upon the setting (e.g., whether to receive the output of the discrete processing processor or integrated processing processor) of the first display device out of the multiple display devices.

If block 1508 determines that the display device is the first display device out of the multiple display devices, block 1510 reads display device configuration of the display device. For example, configuration information (e.g., EDID) of the display device may be obtained and retrieved from the display device.

In block 1512, a determination is made from the configuration information, whether the display device should leverage the discrete graphics processor. For example, if the configuration information indicates that the display device is an HMD, it may be determined that the display device will leverage the discrete graphics processor. The configuration information may be compared to a white list as described above to determine if the display device is to operate with the discrete graphics processor. If the display device does leverage the discrete graphics processor, then in block 1514, the discrete graphics processor may be electrically connected to the display device. For example, a MUX, which receives outputs of both the discrete graphics processor and an integrated graphics processor, may be controlled to provide the discrete graphics processor output to the display device.

If in block 1512 the display device does not leverage the discrete graphics processor, block 1516 may enumerate the display device normally. For example, the display device may be driven by the integrated graphics processor. In block 1518, the display interface is monitored for changes.

The above method 1500 may be implemented by the integrated graphics driver. The above method 1500 may be implemented by the logic (e.g., the analyzer, the information provider and the trigger).

Figure 6:
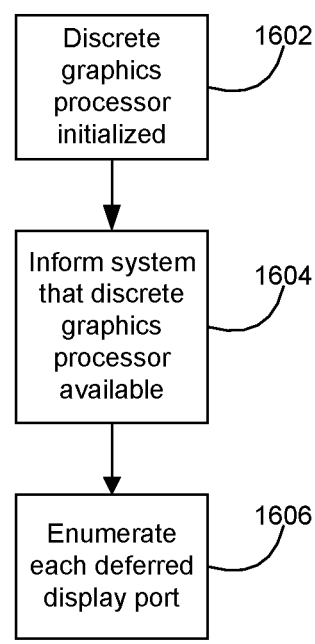

FIG. 6 illustrates a method 1600 of a discrete graphics processor and a discrete graphics processor driver. The method 1600 may be implemented in one or more modules as a set of logic instructions stored in a machine- or computer-readable storage medium such as RAM, ROM, PROM, flash memory, etc., as configurable logic such as, for example, PLAs, FPGAs, CPLDs, as fixed-functionality logic hardware using circuit technology such as, for example, ASIC, CMOS or TTL technology, or any combination thereof.

In block 1602, a discrete graphics driver of a discrete graphics processor is initialized. In block 1604, the system (e.g., BIOS) is informed that the discrete graphics processor and the discrete graphics driver are available. Method 1600 may correspond to block 1402 of method 1300, in which it is determined whether the discrete graphics processor is available. In block 1606, each deferred display port may be enumerated.

Figure 7:
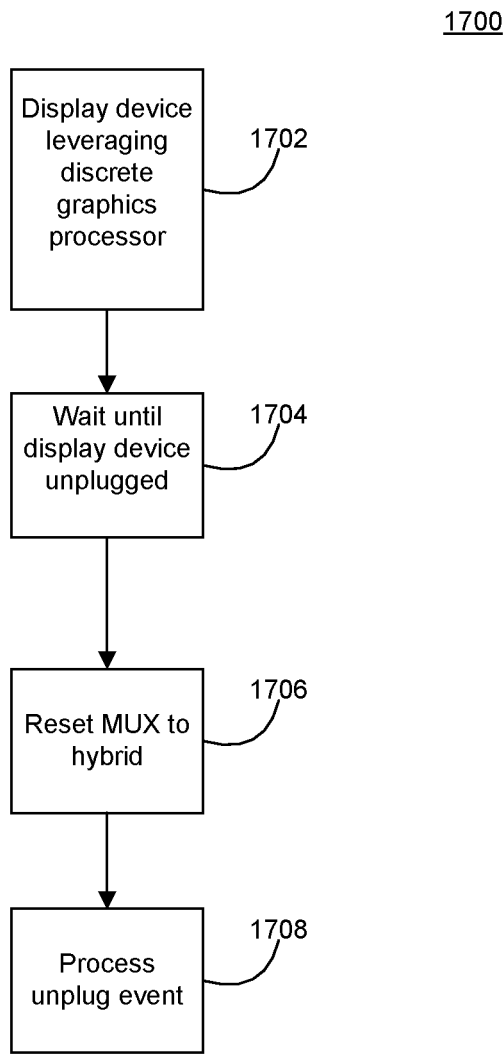

FIG. 7 illustrates a method 1700 of hybrid switching. The method 1700 may be implemented in one or more modules as a set of logic instructions stored in a machine- or computer-readable storage medium such as RAM, ROM, PROM, flash memory, etc., as configurable logic such as, for example, PLAs, FPGAs, CPLDs, as fixed-functionality logic hardware using circuit technology such as, for example, ASIC, CMOS or TTL technology, or any combination thereof.

In block 1702, a display device leverages a discrete graphics processor. For example, a MUX, which receives outputs of both the discrete graphics processor and an integrated graphics processor, may be controlled to provide the discrete graphics processor output to the display device via a display interface, as discussed herein.

In block 1704, the display device is detected as being unplugged. For example, an HPD voltage may be absent from the display interface. In block 1706, the MUX is reset to a hybrid mode so that the integrated graphics processor output is connected to the display interface rather than the discrete graphics processor output. In block 1708, the unplug event may be processed. The above method may be implemented by the discrete graphics driver.

Figure 8:
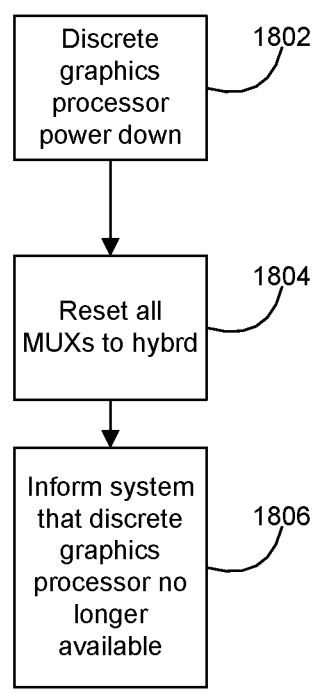

FIG. 8 illustrates a method 1800 of a power down process. The method 1800 may be implemented in one or more modules as a set of logic instructions stored in a machine- or computer-readable storage medium such as RAM, ROM, PROM, flash memory, etc., as configurable logic such as, for example, PLAs, FPGAs, CPLDs, as fixed-functionality logic hardware using circuit technology such as, for example, ASIC, CMOS or TTL technology, or any combination thereof.

In block 1802, a discrete graphics processor begins to be powered down. In block 1804, each MUX is reset to a hybrid mode so that the integrated graphics processor output is connected to the respective display interface of the MUX rather than the discrete graphics processor output. In block 1806, the system (e.g., BIOS) is informed that the discrete graphics processor is no longer available.

Figure 9:
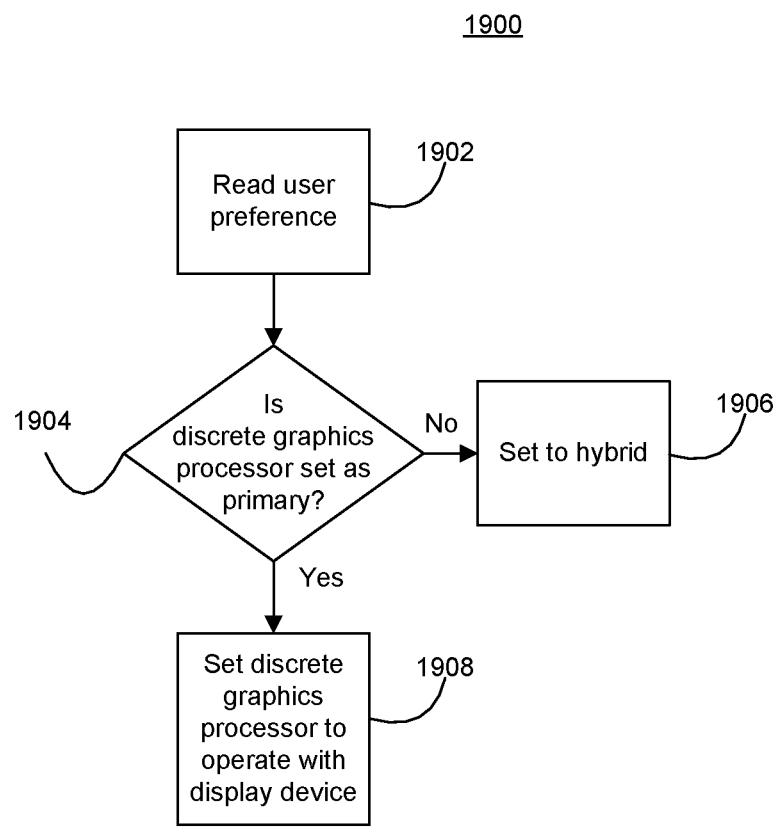

FIG. 9 illustrates a method 1900 of a setting a mode of operation. Method 1900 may be implemented by BIOS, and occur during a boot up, wake up or initialization of a computing system. The method 1900 may be implemented in one or more modules as a set of logic instructions stored in a machine- or computer-readable storage medium such as RAM, ROM, PROM, flash memory, etc., as configurable logic such as, for example, PLAs, FPGAs, CPLDs, as fixed-functionality logic hardware using circuit technology such as, for example, ASIC, CMOS or TTL technology, or any combination thereof.

In block 1902, a user preference may be read. For example, memory may be read to determine the preference. In some embodiments, a BIOS switch is read. In block 1904, a determination is made whether the discrete graphics processor is set as a primary graphics processor based upon information from the preference. If the preference indicates that the discrete graphics processor is to be operated with a display device, then the block 1908 may set the discrete graphics processor to be electrically connected with the display device via a MUX for example and as described above. Furthermore, ASL configuration information to change the MUX to connect either of the integrated graphics processor or a discrete graphics processor may be suppressed so that other elements (e.g., integrated graphics driver) cannot change the MUX.

If in block 1904, it is determined that the preference does not indicate that the discrete graphics processor is to be operated with the discrete graphics processor, the MUX may be set to a hybrid mode to allow for selectively electrically connecting an integrated graphics processor to the display device, or the discrete graphics processor to the display device, as described above. For example, the ASL configuration information to change the MUX to connect either of the integrated graphics processor or the discrete graphics processor may be shared so that other elements (e.g., integrated graphics driver) can change the MUX.

The user preference above may be a preference set by the user, through for example the BIOS. The preference may also be set by a manufacturer of the display device.

Figure 10:
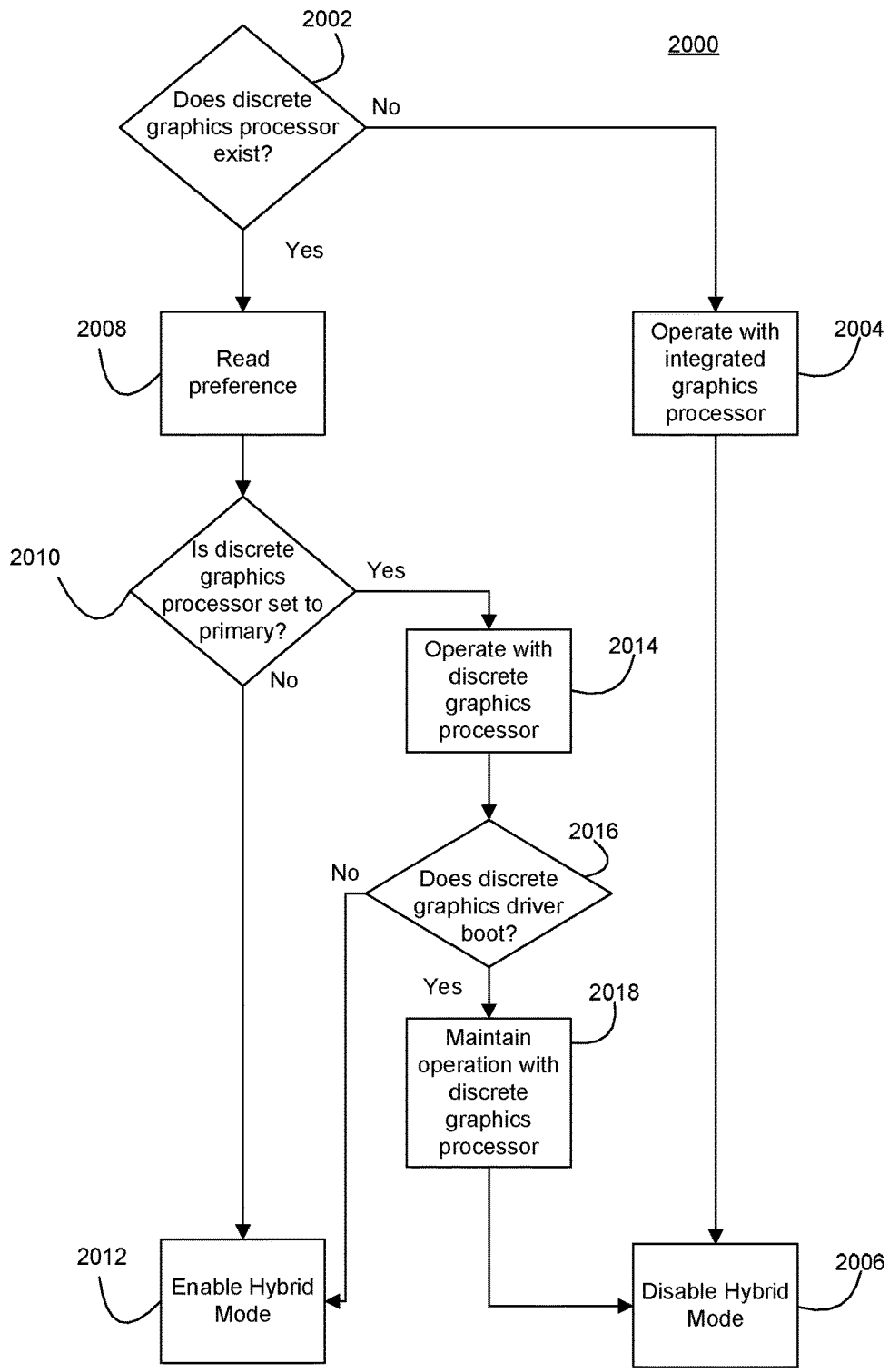

FIG. 10 illustrates a method 2000 of setting a mode of operation. Method 2000 may be implemented by BIOS, and occur during a boot up, wake up or initialization of a computing system. The method 2000 may be implemented in one or more modules as a set of logic instructions stored in a machine- or computer-readable storage medium such as RAM, ROM, PROM, flash memory, etc., as configurable logic such as, for example, PLAs, FPGAs, CPLDs, as fixed-functionality logic hardware using circuit technology such as, for example, ASIC, CMOS or TTL technology, or any combination thereof.

Block 2002 may determine whether a discrete graphics processor exists. For example, block 2002 may determine if the discrete graphics processor was detected during a previous boot-up of the computing system, which occurred prior to the present boot-up, or another way to detect the discrete graphics processor. If the discrete graphics processor was undetected, block 2004 may operate each connected display device with the integrated graphics processor. For example, a MUX may be set to electrically connect the integrated graphics processor to the display device. In block 2006, a hybrid mode may be disabled for each MUX so that each MUX cannot be changed to prevent the MUXs from electrically disconnecting the integrated graphics processor from the display devices. For example, an ASL configuration information to change the MUX to connect either of the integrated graphics processor or the discrete graphics processor may be suppressed so that other elements (e.g., integrated graphics driver) cannot change the MUX. In some embodiments, if the discrete graphics processor was undetected, a prompt may also be displayed to the user to indicate that the discrete graphics processor is unavailable.

If in block 2002, it is determined that the discrete graphics driver was detected in the previous operating of the computing system, then a preference is read by block 2008. Block 2010 may determine if the preference indicates that the discrete graphics processor is selected to operate with a display device so that the discrete graphics processor is the primary driver of the display device. If in block 2010 the preference indicates that the discrete graphics processor is to be selected, block 2014 sets the discrete graphics processor to operate with the display device. For example, a MUX may be set to electrically connect the discrete graphics processor with the display device. The method 2000 may then proceed to block 2016 where it is determined if the discrete graphics driver of the discrete graphics processor boots. If the discrete graphics driver does not boot, block 2012 may enable hybrid mode of the MUX so that the MUX may controlled to allow the display device to be connected to the integrated graphics processor. If the discrete graphics driver does boot, block 2018 maintains the operation of the display device with the discrete graphics processor so that the display device is driven by the discrete graphics processor. The method 2000 may proceed to block 2006, where the hybrid mode is disabled so that the discrete graphics processor is not electrically disconnected from the display device. For example, an ASL configuration information (which may be ACPI Source Language) to change the MUX to connect either of the integrated graphics processor or the discrete graphics processor may be suppressed so that other elements (e.g., integrated graphics driver) cannot change the MUX.

If in block 2010, the preference does not indicate that the discrete graphics processor is to be connected to the display device, the method 2000 may proceed to block 2012. In block 2012, the hybrid mode may be enabled to allow the MUX to switch between electrically connecting the display device to the integrated graphics processor and the discrete graphics processor. For example, the ASL configuration information to change the MUX to connect either of the integrated graphics processor or a discrete graphics processor may be shared so that other elements (e.g., integrated graphics driver) can change the MUX.

The preference above may be a user preference. The preference may also be set by a manufacturer of the display device. In some embodiments, the same user preference may be applied to all displays, so that all displays are mapped to the same integrated graphics processor or discrete graphics processor. Furthermore, the user preference may indicate whether a display device is to be connected to the integrated graphics processor, rather than the discrete graphics processor.

The above method 2000 may also apply to each display device.

Figure 11:
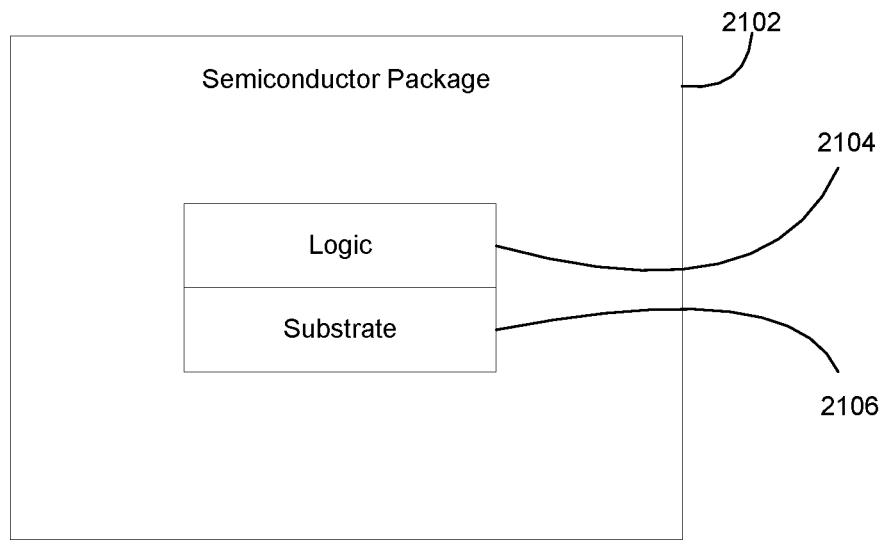
FIG. 11 is a block diagram of an example of a semiconductor package.

FIG. 11 shows a semiconductor package 2102. The semiconductor package 2102 may implement one or more aspects of the methods 70 (FIG. 2), 1300 (FIGS. 3-4), 1500 (FIG. 5), 1600 (FIG. 6), 1700 (FIG. 7), 1800 (FIG. 8), 1900 (FIG. 9), and 2000 (FIG. 10) and may be readily substituted for the information provider 54, analyzer 24 and trigger 26 (FIG. 1), already discussed. The illustrated apparatus 2102 includes a substrate 2106 (e.g., silicon, sapphire, gallium arsenide) and logic 2104 (e.g., transistor array and other integrated circuit/IC components) coupled to the substrate 2106. The logic 2104 may be implemented at least partly in configurable logic or fixed-functionality logic hardware. Moreover, the logic 2104 may detect a successful boot of a discrete graphics processor in a computing system, detect a display device, determine whether to operate the display device with the discrete graphics processor or integrated graphics processor, and modify an associated element (e.g., a MUX) to operate the display device with the discrete graphics processor or the integrated graphics processor in accordance with the determination.

System Overview

Figure 12:
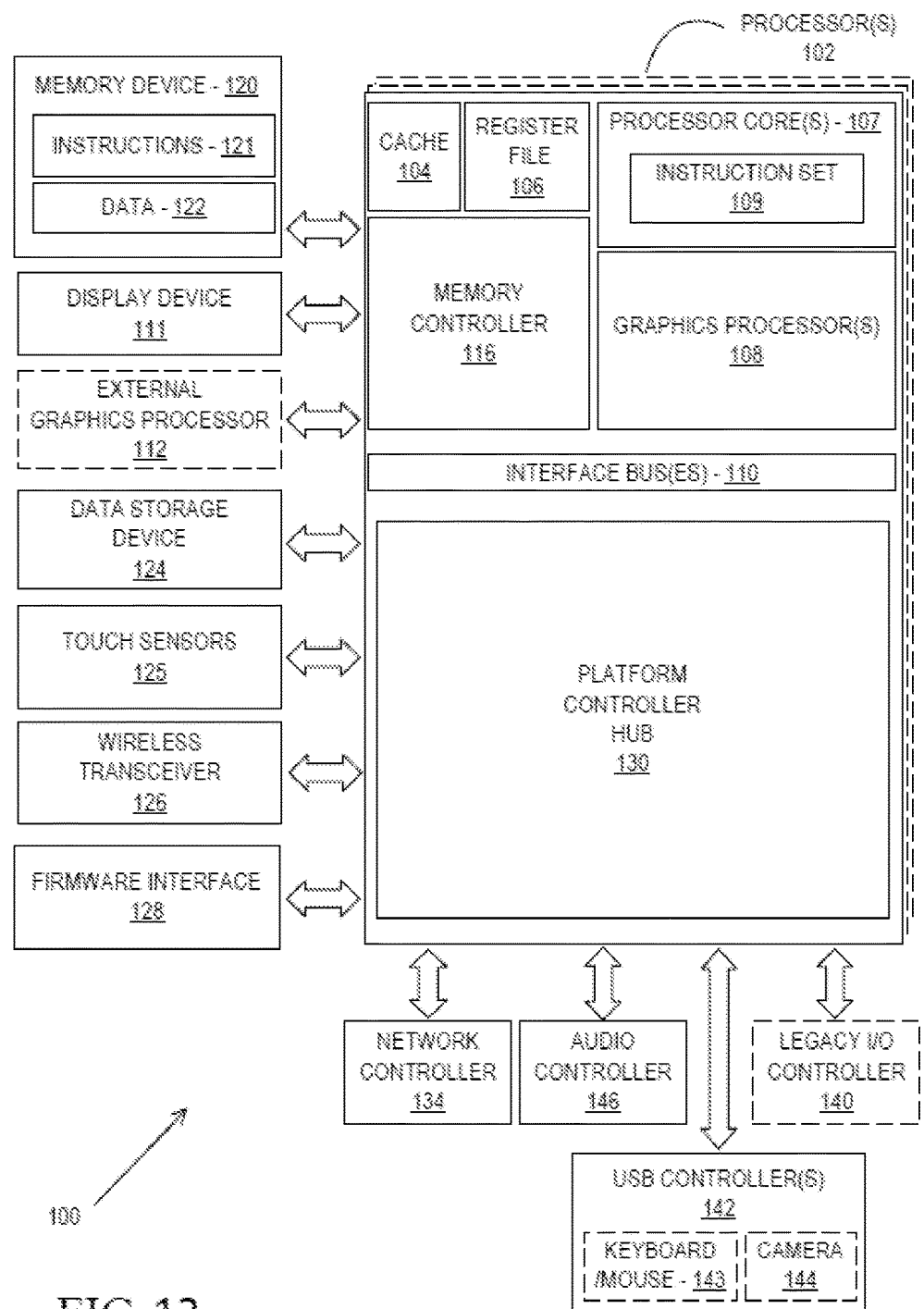
FIG. 12 is a block diagram of an example of an overview of a processing system according to an embodiment.

FIG. 12 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices.

In one embodiment the system 100 can include, or be incorporated within a server-based gaming platform, a game console, including a game and media console, a mobile gaming console, a handheld game console, or an online game console. In some embodiments the system 100 is a mobile phone, smart phone, tablet computing device or mobile Internet device. The processing system 100 can also include, couple with, or be integrated within a wearable device, such as a smart watch wearable device, smart eyewear device, augmented reality device, or virtual reality device. In some embodiments, the processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, one or more processor(s) 102 are coupled with one or more interface bus(es) 110 to transmit communication signals such as address, data, or control signals between processor 102 and other components in the system 100. The interface bus 110, in one embodiment, can be a processor bus, such as a version of the Direct Media Interface (DMI) bus. However, processor busses are not limited to the DMI bus, and may include one or more Peripheral Component Interconnect buses (e.g., PCI, PCI Express), memory busses, or other types of interface busses. In one embodiment the processor(s) 102 include an integrated memory controller 116 and a platform controller hub 130. The memory controller 116 facilitates communication between a memory device and other components of the system 100, while the platform controller hub (PCH) 130 provides connections to I/O devices via a local I/O bus.

The memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller 116 also couples with an optional external graphics processor 112, which may communicate with the one or more graphics processors 108 in processors 102 to perform graphics and media operations. In some embodiments a display device 111 can connect to the processor(s) 102. The display device 111 can be one or more of an internal display device, as in a mobile electronic device or a laptop device or an external display device attached via a display interface (e.g., DisplayPort, etc.). In one embodiment the display device 111 can be a head mounted display (HMD) such as a stereoscopic display device for use in virtual reality (VR) applications or augmented reality (AR) applications.

In some embodiments the platform controller hub 130 enables peripherals to connect to memory device 120 and processor 102 via a high-speed I/O bus. The I/O peripherals include, but are not limited to, an audio controller 146, a network controller 134, a firmware interface 128, a wireless transceiver 126, touch sensors 125, a data storage device 124 (e.g., hard disk drive, flash memory, etc.). The data storage device 124 can connect via a storage interface (e.g., SATA) or via a peripheral bus, such as a Peripheral Component Interconnect bus (e.g., PCI, PCI Express). The touch sensors 125 can include touch screen sensors, pressure sensors, or fingerprint sensors. The wireless transceiver 126 can be a Wi-Fi transceiver, a Bluetooth transceiver, or a mobile network transceiver such as a 3G, 4G, or Long Term Evolution (LTE) transceiver. The firmware interface 128 enables communication with system firmware, and can be, for example, a unified extensible firmware interface (UEFI). The network controller 134 can enable a network connection to a wired network. In some embodiments, a high-performance network controller (not shown) couples with the interface bus 110. The audio controller 146, in one embodiment, is a multi-channel high definition audio controller. In one embodiment the system 100 includes an optional legacy I/O controller 140 for coupling legacy (e.g., Personal System 2 (PS/2)) devices to the system. The platform controller hub 130 can also connect to one or more Universal Serial Bus (USB) controllers 142 connect input devices, such as keyboard and mouse 143 combinations, a camera 144, or other USB input devices.

It will be appreciated that the system 100 shown is exemplary and not limiting, as other types of data processing systems that are differently configured may also be used. For example, an instance of the memory controller 116 and platform controller hub 130 may be integrated into a discreet external graphics processor, such as the external graphics processor 112. In one embodiment the platform controller hub 130 and/or memory controller 160 may be external to the one or more processor(s) 102. For example, the system 100 can include an external memory controller 116 and platform controller hub 130, which may be configured as a memory controller hub and peripheral controller hub within a system chipset that is in communication with the processor(s) 102.

Figure 13:
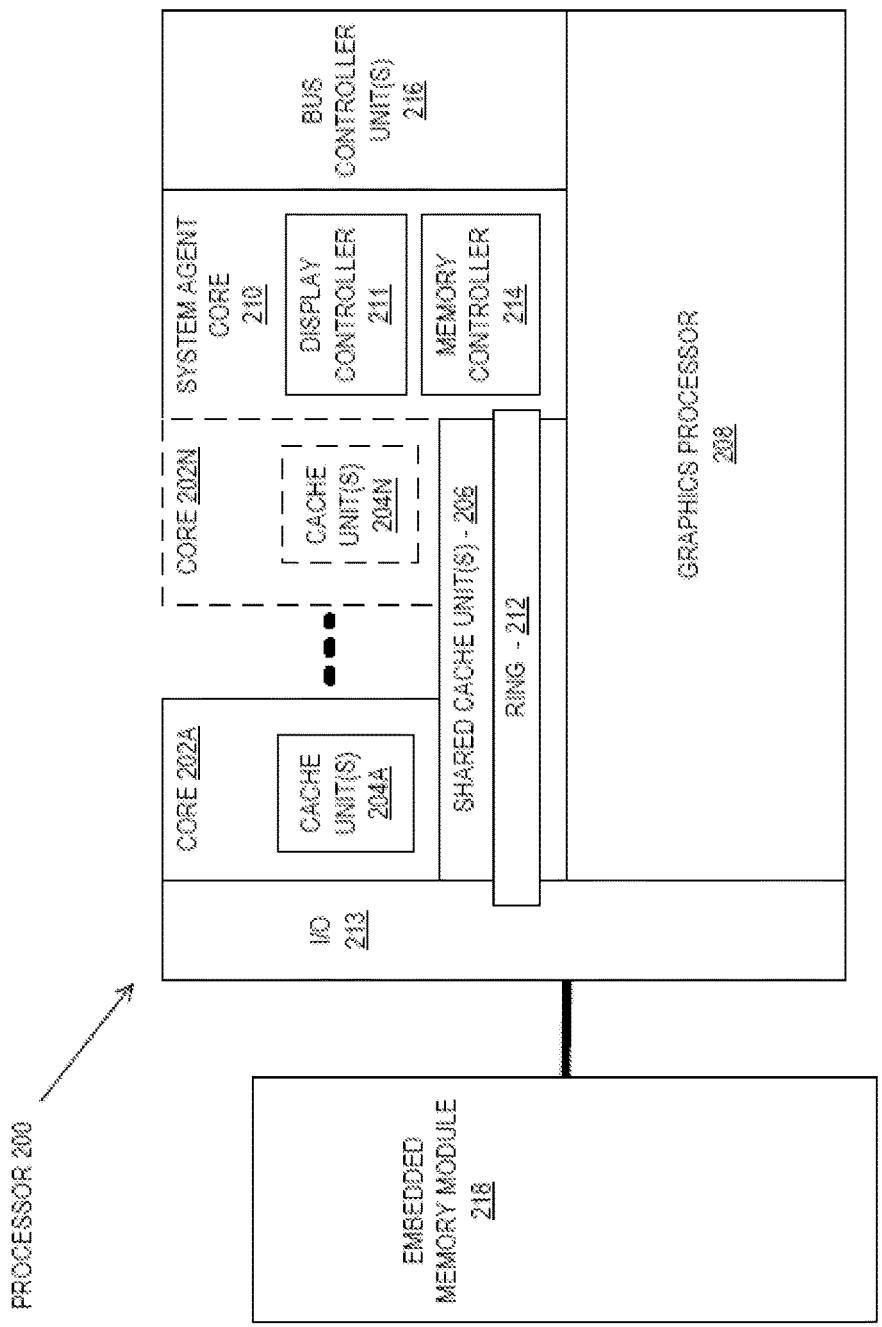
FIG. 13 is a block diagram of an example of an overview of a processor according to an embodiment.

FIG. 13 is a block diagram of an embodiment of a processor 200 having one or more processor cores 202A-202N, an integrated memory controller 214, and an integrated graphics processor 208. Those elements of FIG. 13 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more PCI or PCI express busses. System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, the system agent core 210 also includes a display controller 211 to drive graphics processor output to one or more coupled displays. In some embodiments, display controller 211 may also be a separate module coupled with the graphics processor via at least one interconnect, or may be integrated within the graphics processor 208.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 14:
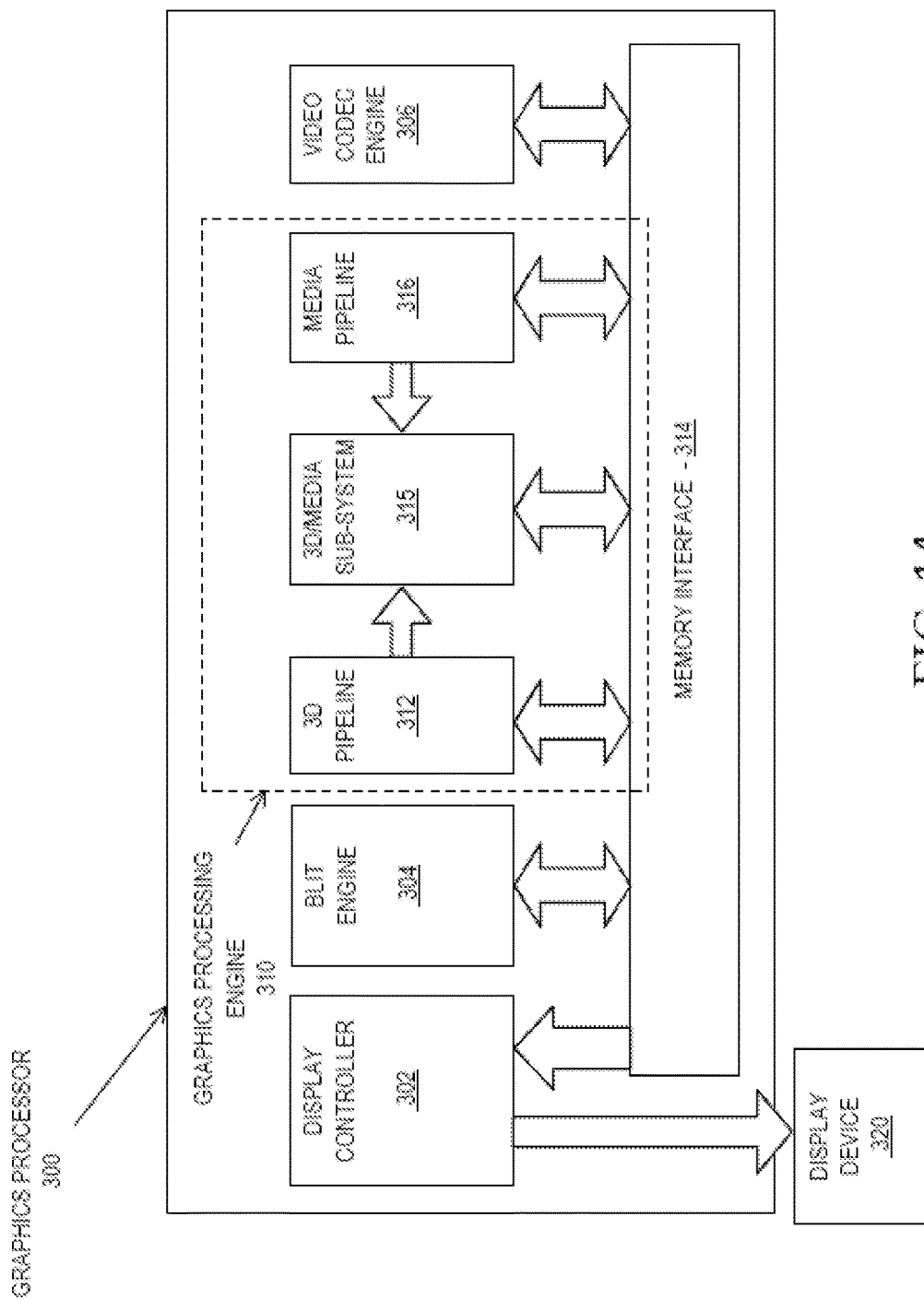
FIG. 14 is a block diagram of an example of an overview of a graphics processor according to an embodiment.

FIG. 14 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. The display device 320 can be an internal or external display device. In one embodiment the display device 320 is a head mounted display device, such as a virtual reality (VR) display device or an augmented reality (AR) display device. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

Graphics Processing Engine

Figure 15:
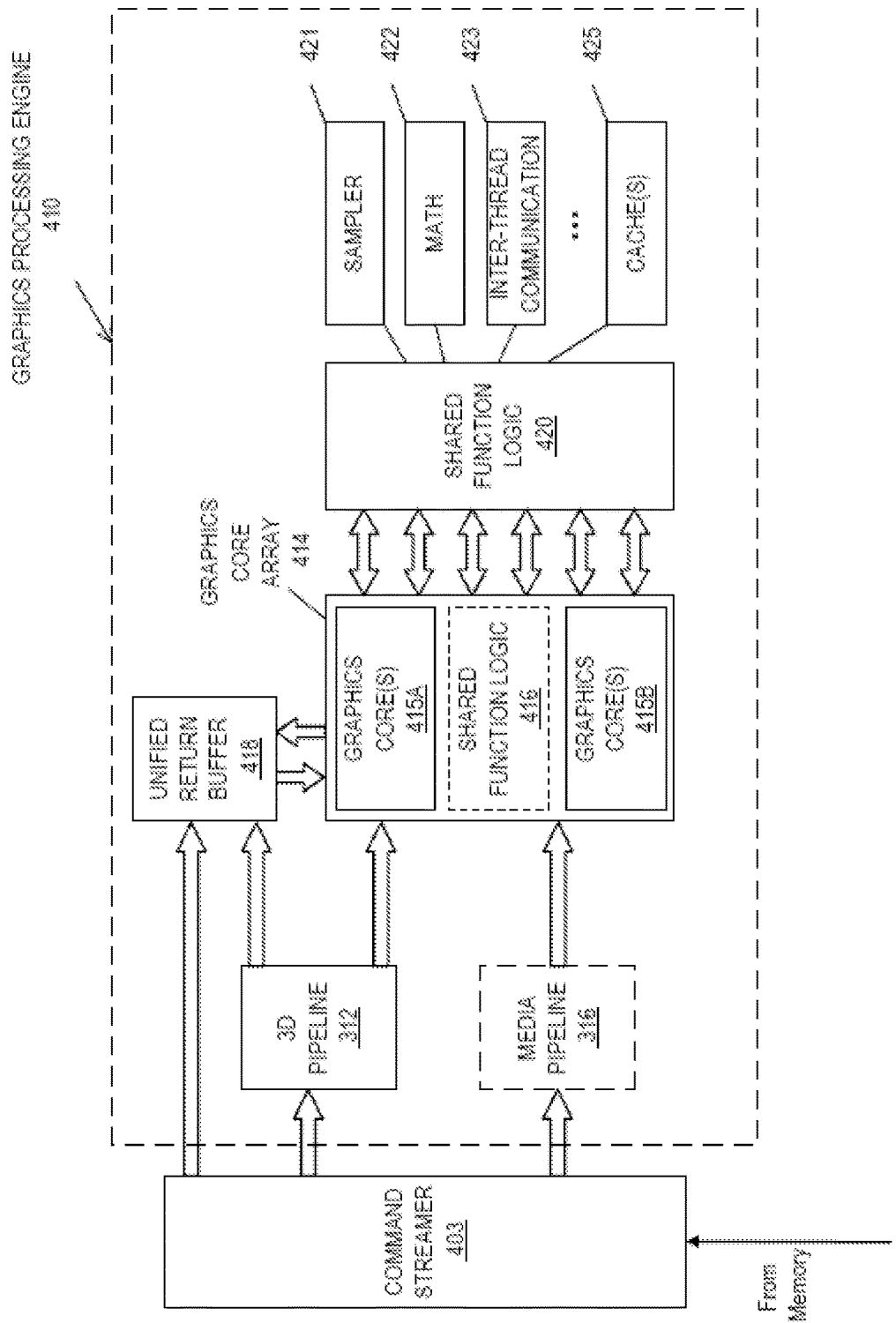
FIG. 15 is a block diagram of an example of a graphics processing engine according to an embodiment.

FIG. 15 is a block diagram of a graphics processing engine 410 of a graphics processor in accordance with some embodiments. In one embodiment, the graphics processing engine (GPE) 410 is a version of the GPE 310 shown in FIG. 14. Elements of FIG. 15 having the same reference numbers (or names) as the elements of any other figure herein can operate or function in any manner similar to that described elsewhere herein, but are not limited to such. For example, the 3D pipeline 312 and media pipeline 316 of FIG. 14 are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414. In one embodiment the graphics core array 414 include one or more blocks of graphics cores (e.g., graphics core(s) 415A, graphics core(s) 415B), each block including one or more graphics cores. Each graphics core includes a set of graphics execution resources that includes general-purpose and graphics specific execution logic to perform graphics and compute operations, as well as fixed function texture processing and/or machine learning and artificial intelligence acceleration logic.

In various embodiments the 3D pipeline 312 includes fixed function and programmable logic to process one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources for use in processing these shader programs. Multi-purpose execution logic (e.g., execution units) within the graphics core(s) 415A-414B of the graphic core array 414 includes support for various 3D API shader languages and can execute multiple simultaneous execution threads associated with multiple shaders.

In some embodiments the graphics core array 414 also includes execution logic to perform media functions, such as video and/or image processing. In one embodiment, the execution units additionally include general-purpose logic that is programmable to perform parallel general-purpose computational operations, in addition to graphics processing operations. The general-purpose logic can perform processing operations in parallel or in conjunction with general-purpose logic within the processor core(s) 107 of FIG. 12 or core 202A-202N as in FIG. 13.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420.

A shared function is implemented where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies across embodiments. In some embodiments, specific shared functions within the shared function logic 420 that are used extensively by the graphics core array 414 may be included within shared function logic 416 within the graphics core array 414. In various embodiments, the shared function logic 416 within the graphics core array 414 can include some or all logic within the shared function logic 420. In one embodiment, all logic elements within the shared function logic 420 may be duplicated within the shared function logic 416 of the graphics core array 414. In one embodiment the shared function logic 420 is excluded in favor of the shared function logic 416 within the graphics core array 414.

Figure 16:
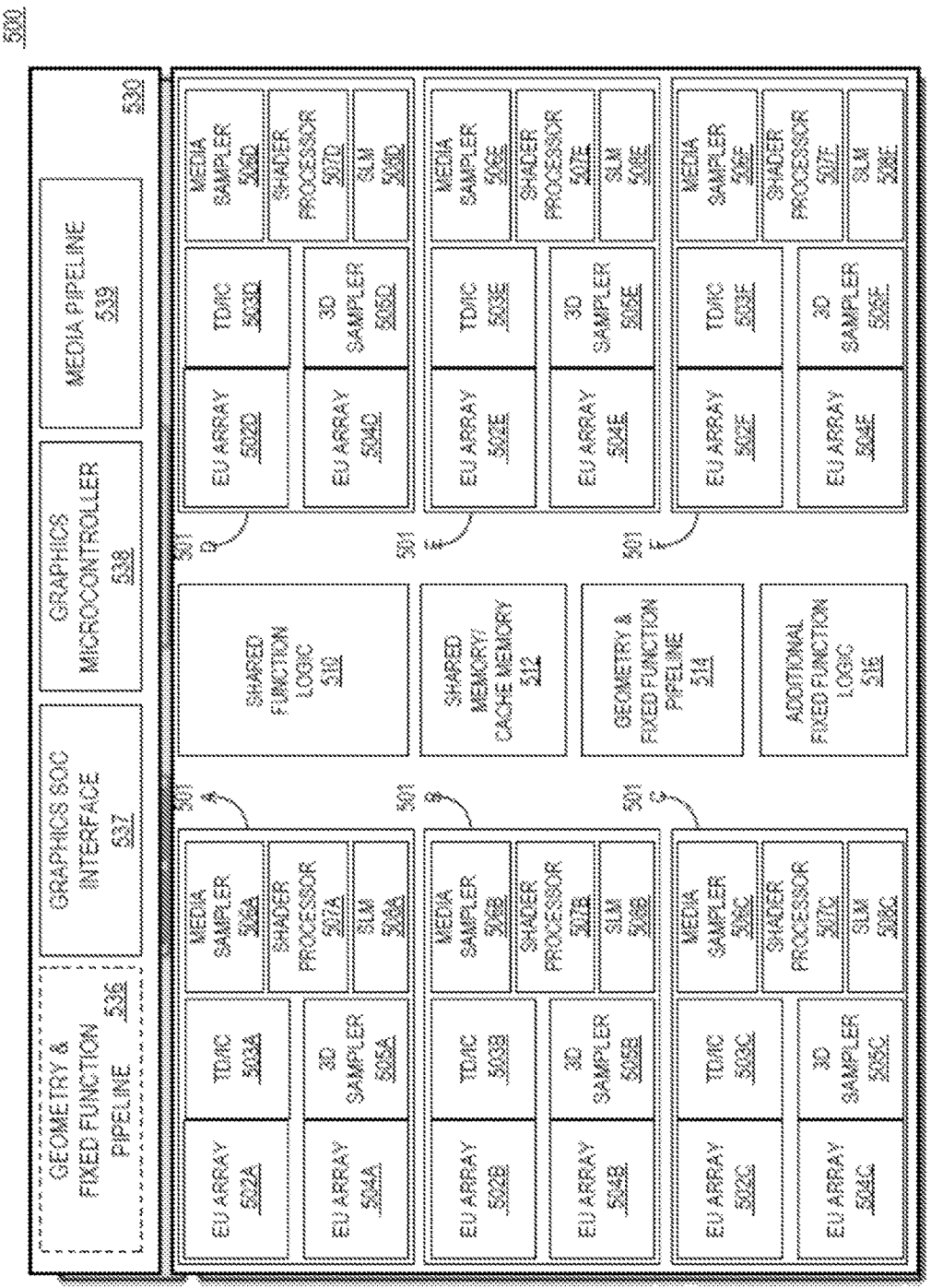
FIG. 16 is a block diagram of an example of a graphics processor core according to an embodiment.

FIG. 16 is a block diagram of hardware logic of a graphics processor core 500, according to some embodiments described herein. Elements of FIG. 16 having the same reference numbers (or names) as the elements of any other figure herein can operate or function in any manner similar to that described elsewhere herein, but are not limited to such. The illustrated graphics processor core 500, in some embodiments, is included within the graphics core array 414 of FIG. 15. The graphics processor core 500, sometimes referred to as a core slice, can be one or multiple graphics cores within a modular graphics processor. The graphics processor core 500 is exemplary of one graphics core slice, and a graphics processor as described herein may include multiple graphics core slices based on target power and performance envelopes. Each graphics core 500 can include a fixed function block 530 coupled with multiple sub-cores 501A-501F, also referred to as sub-slices, that include modular blocks of general-purpose and fixed function logic.

In some embodiments the fixed function block 530 includes a geometry/fixed function pipeline 536 that can be shared by all sub-cores in the graphics processor 500, for example, in lower performance and/or lower power graphics processor implementations. In various embodiments, the geometry/fixed function pipeline 536 includes a 3D fixed function pipeline (e.g., 3D pipeline 312 as in FIG. 14 and FIG. 15) a video front-end unit, a thread spawner and thread dispatcher, and a unified return buffer manager, which manages unified return buffers, such as the unified return buffer 418 of FIG. 15.

In one embodiment the fixed function block 530 also includes a graphics SoC interface 537, a graphics microcontroller 538, and a media pipeline 539. The graphics SoC interface 537 provides an interface between the graphics core 500 and other processor cores within a system on a chip integrated circuit. The graphics microcontroller 538 is a programmable sub-processor that is configurable to manage various functions of the graphics processor 500, including thread dispatch, scheduling, and pre-emption. The media pipeline 539 (e.g., media pipeline 316 of FIG. 14 and FIG. 15) includes logic to facilitate the decoding, encoding, pre-processing, and/or post-processing of multimedia data, including image and video data. The media pipeline 539 implement media operations via requests to compute or sampling logic within the sub-cores 501-501F.

In one embodiment the SoC interface 537 enables the graphics core 500 to communicate with general-purpose application processor cores (e.g., CPUs) and/or other components within an SoC, including memory hierarchy elements such as a shared last level cache memory, the system RAM, and/or embedded on-chip or on-package DRAM. The SoC interface 537 can also enable communication with fixed function devices within the SoC, such as camera imaging pipelines, and enables the use of and/or implements global memory atomics that may be shared between the graphics core 500 and CPUs within the SoC. The SoC interface 537 can also implement power management controls for the graphics core 500 and enable an interface between a clock domain of the graphic core 500 and other clock domains within the SoC. In one embodiment the SoC interface 537 enables receipt of command buffers from a command streamer and global thread dispatcher that are configured to provide commands and instructions to each of one or more graphics cores within a graphics processor. The commands and instructions can be dispatched to the media pipeline 539, when media operations are to be performed, or a geometry and fixed function pipeline (e.g., geometry and fixed function pipeline 536, geometry and fixed function pipeline 514) when graphics processing operations are to be performed.

The graphics microcontroller 538 can be configured to perform various scheduling and management tasks for the graphics core 500. In one embodiment the graphics microcontroller 538 can perform graphics and/or compute workload scheduling on the various graphics parallel engines within execution unit (EU) arrays 502A-502F, 504A-504F within the sub-cores 501A-501F. In this scheduling model, host software executing on a CPU core of an SoC including the graphics core 500 can submit workloads one of multiple graphic processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment the graphics microcontroller 538 can also facilitate low-power or idle states for the graphics core 500, providing the graphics core 500 with the ability to save and restore registers within the graphics core 500 across low-power state transitions independently from the operating system and/or graphics driver software on the system.

The graphics core 500 may have greater than or fewer than the illustrated sub-cores 501A-501F, up to N modular sub-cores. For each set of N sub-cores, the graphics core 500 can also include shared function logic 510, shared and/or cache memory 512, a geometry/fixed function pipeline 514, as well as additional fixed function logic 516 to accelerate various graphics and compute processing operations. The shared function logic 510 can include logic units associated with the shared function logic 420 of FIG. 15 (e.g., sampler, math, and/or inter-thread communication logic) that can be shared by each N sub-cores within the graphics core 500. The shared and/or cache memory 512 can be a last-level cache for the set of N sub-cores 501A-501F within the graphics core 500, and can also serve as shared memory that is accessible by multiple sub-cores. The geometry/fixed function pipeline 514 can be included instead of the geometry/fixed function pipeline 536 within the fixed function block 530 and can include the same or similar logic units.

In one embodiment the graphics core 500 includes additional fixed function logic 516 that can include various fixed function acceleration logic for use by the graphics core 500. In one embodiment the additional fixed function logic 516 includes an additional geometry pipeline for use in position only shading. In position-only shading, two geometry pipelines exist, the full geometry pipeline within the geometry/fixed function pipeline 516, 536, and a cull pipeline, which is an additional geometry pipeline which may be included within the additional fixed function logic 516. In one embodiment the cull pipeline is a trimmed down version of the full geometry pipeline. The full pipeline and the cull pipeline can execute different instances of the same application, each instance having a separate context. Position only shading can hide long cull runs of discarded triangles, enabling shading to be completed earlier in some instances. For example and in one embodiment the cull pipeline logic within the additional fixed function logic 516 can execute position shaders in parallel with the main application and generally generates critical results faster than the full pipeline, as the cull pipeline fetches and shades only the position attribute of the vertices, without performing rasterization and rendering of the pixels to the frame buffer. The cull pipeline can use the generated critical results to compute visibility information for all the triangles without regard to whether those triangles are culled. The full pipeline (which in this instance may be referred to as a replay pipeline) can consume the visibility information to skip the culled triangles to shade only the visible triangles that are finally passed to the rasterization phase.

In one embodiment the additional fixed function logic 516 can also include machine-learning acceleration logic, such as fixed function matrix multiplication logic, for implementations including optimizations for machine learning training or inferencing.

Within each graphics sub-core 501A-501F includes a set of execution resources that may be used to perform graphics, media, and compute operations in response to requests by graphics pipeline, media pipeline, or shader programs. The graphics sub-cores 501A-501F include multiple EU arrays 502A-502F, 504A-504F, thread dispatch and inter-thread communication (TD/IC) logic 503A-503F, a 3D (e.g., texture) sampler 505A-505F, a media sampler 506A-506F, a shader processor 507A-507F, and shared local memory (SLM) 508A-508F. The EU arrays 502A-502F, 504A-504F each include multiple execution units, which are general-purpose graphics processing units capable of performing floating-point and integer/fixed-point logic operations in service of a graphics, media, or compute operation, including graphics, media, or compute shader programs. The TD/IC logic 503A-503F performs local thread dispatch and thread control operations for the execution units within a sub-core and facilitate communication between threads executing on the execution units of the sub-core. The 3D sampler 505A-505F can read texture or other 3D graphics related data into memory. The 3D sampler can read texture data differently based on a configured sample state and the texture format associated with a given texture. The media sampler 506A-506F can perform similar read operations based on the type and format associated with media data. In one embodiment, each graphics sub-core 501A-501F can alternately include a unified 3D and media sampler. Threads executing on the execution units within each of the sub-cores 501A-501F can make use of shared local memory 508A-508F within each sub-core, to enable threads executing within a thread group to execute using a common pool of on-chip memory.

Execution Units

Figure 17A:
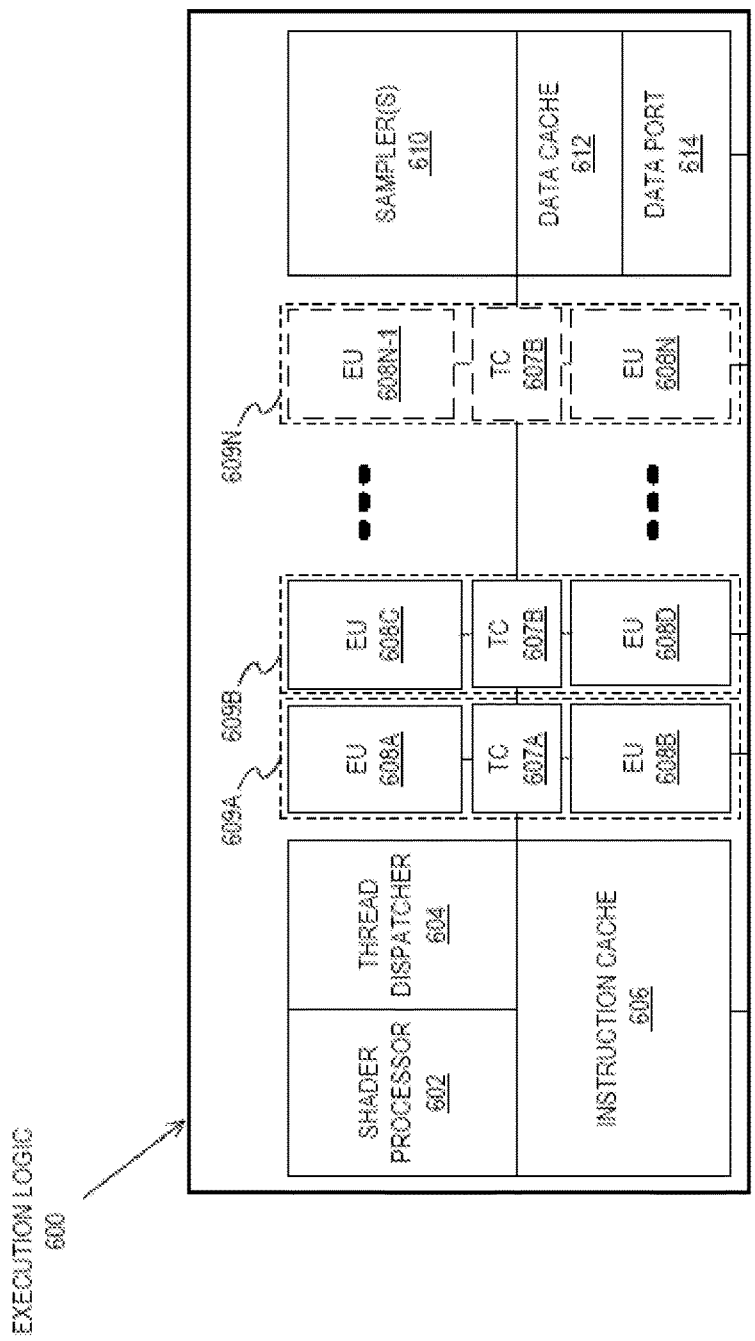
FIG. 17A-17B illustrates execution logic of an embodiment.
Figure 17B:
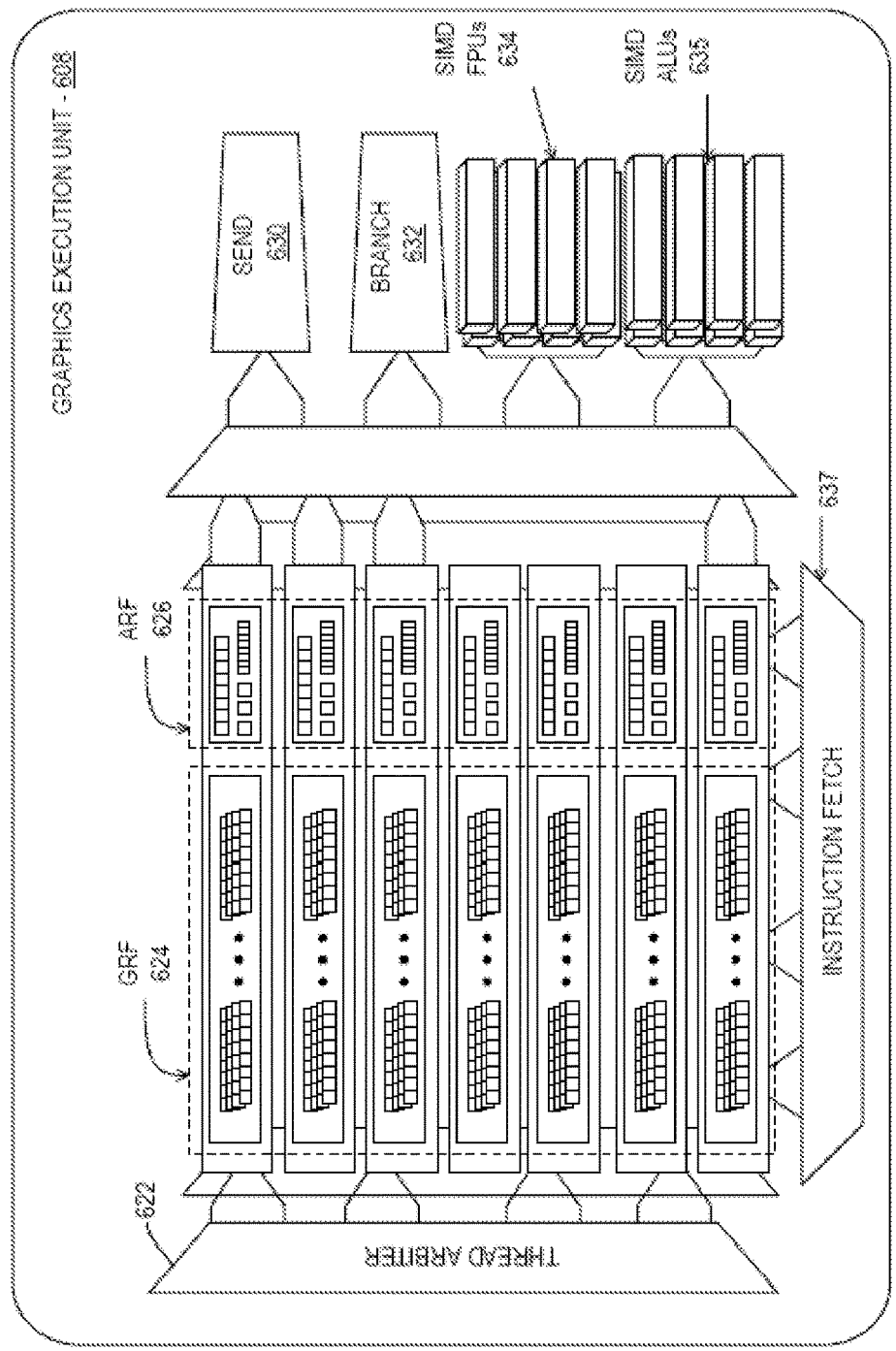

FIGS. 17A-17B illustrate thread execution logic 600 including an array of processing elements employed in a graphics processor core according to embodiments described herein. Elements of FIGS. 17A-17B having the same reference numbers (or names) as the elements of any other figure herein can operate or function in any manner similar to that described elsewhere herein, but are not limited to such. FIG. 17A illustrates an overview of thread execution logic 600, which can include a variant of the hardware logic illustrated with each sub-core 501A-501F of FIG. 16. FIG. 17B illustrates exemplary internal details of an execution unit.

As illustrated in FIG. 17A, in some embodiments thread execution logic 600 includes a shader processor 602, a thread dispatcher 604, instruction cache 606, a scalable execution unit array including a plurality of execution units 608A-608N, a sampler 610, a data cache 612, and a data port 614. In one embodiment the scalable execution unit array can dynamically scale by enabling or disabling one or more execution units (e.g., any of execution unit 608A, 608B, 608C, 608D, through 608N-1 and 608N) based on the computational requirements of a workload. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution units 608A-608N. In some embodiments, each execution unit (e.g. 608A) is a stand-alone programmable general-purpose computational unit that is capable of executing multiple simultaneous hardware threads while processing multiple data elements in parallel for each thread. In various embodiments, the array of execution units 608A-608N is scalable to include any number individual execution units.

In some embodiments, the execution units 608A-608N are primarily used to execute shader programs. A shader processor 602 can process the various shader programs and dispatch execution threads associated with the shader programs via a thread dispatcher 604. In one embodiment the thread dispatcher includes logic to arbitrate thread initiation requests from the graphics and media pipelines and instantiate the requested threads on one or more execution unit in the execution units 608A-608N. For example, a geometry pipeline can dispatch vertex, tessellation, or geometry shaders to the thread execution logic for processing. In some embodiments, thread dispatcher 604 can also process runtime thread spawning requests from the executing shader programs.

In some embodiments, the execution units 608A-608N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 608A-608N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 608A-608N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

In one embodiment one or more execution units can be combined into a fused execution unit 609A-609N having thread control logic (607A-607N) that is common to the fused EUs. Multiple EUs can be fused into an EU group. Each EU in the fused EU group can be configured to execute a separate SIMD hardware thread. The number of EUs in a fused EU group can vary according to embodiments. Additionally, various SIMD widths can be performed per-EU, including but not limited to SIMD8, SIMD16, and SIMD32. Each fused graphics execution unit 609A-609N includes at least two execution units. For example, fused execution unit 609A includes a first EU 608A, second EU 608B, and thread control logic 607A that is common to the first EU 608A and the second EU 608B. The thread control logic 607A controls threads executed on the fused graphics execution unit 609A, allowing each EU within the fused execution units 609A-609N to execute using a common instruction pointer register.

One or more internal instruction caches (e.g., 606) are included in the thread execution logic 600 to cache thread instructions for the execution units. In some embodiments, one or more data caches (e.g., 612) are included to cache thread data during thread execution. In some embodiments, a sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. Once a group of geometric objects has been processed and rasterized into pixel data, pixel processor logic (e.g., pixel shader logic, fragment shader logic, etc.) within the shader processor 602 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 602 then executes an application programming interface (API)-supplied pixel or fragment shader program. To execute the shader program, the shader processor 602 dispatches threads to an execution unit (e.g., 608A) via thread dispatcher 604. In some embodiments, shader processor 602 uses texture sampling logic in the sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 to output processed data to memory for further processing on a graphics processor output pipeline. In some embodiments, the data port 614 includes or couples to one or more cache memories (e.g., data cache 612) to cache data for memory access via the data port.

As illustrated in FIG. 17B, a graphics execution unit 608 can include an instruction fetch unit 637, a general register file array (GRF) 624, an architectural register file array (ARF) 626, a thread arbiter 622, a send unit 630, a branch unit 632, a set of SIMD floating point units (FPUs) 634, and in one embodiment a set of dedicated integer SIMD ALUs 635. The GRF 624 and ARF 626 includes the set of general register files and architecture register files associated with each simultaneous hardware thread that may be active in the graphics execution unit 608. In one embodiment, per thread architectural state is maintained in the ARF 626, while data used during thread execution is stored in the GRF 624. The execution state of each thread, including the instruction pointers for each thread, can be held in thread-specific registers in the ARF 626.

In one embodiment the graphics execution unit 608 has an architecture that is a combination of Simultaneous Multi-Threading (SMT) and fine-grained Interleaved Multi-Threading (IMT). The architecture has a modular configuration that can be fine tuned at design time based on a target number of simultaneous threads and number of registers per execution unit, where execution unit resources are divided across logic used to execute multiple simultaneous threads.

In one embodiment, the graphics execution unit 608 can co-issue multiple instructions, which may each be different instructions. The thread arbiter 622 of the graphics execution unit thread 608 can dispatch the instructions to one of the send unit 630, branch unit 642, or SIMD FPU(s) 634 for execution. Each execution thread can access 128 general-purpose registers within the GRF 624, where each register can store 32 bytes, accessible as a SIMD 8-element vector of 32-bit data elements. In one embodiment, each execution unit thread has access to 4 Kbytes within the GRF 624, although embodiments are not so limited, and greater or fewer register resources may be provided in other embodiments. In one embodiment up to seven threads can execute simultaneously, although the number of threads per execution unit can also vary according to embodiments. In an embodiment in which seven threads may access 4 Kbytes, the GRF 624 can store a total of 28 Kbytes. Flexible addressing modes can permit registers to be addressed together to build effectively wider registers or to represent strided rectangular block data structures.

In one embodiment, memory operations, sampler operations, and other longer-latency system communications are dispatched via "send" instructions that are executed by the message passing send unit 630. In one embodiment, branch instructions are dispatched to a dedicated branch unit 632 to facilitate SIMD divergence and eventual convergence.

In one embodiment the graphics execution unit 608 includes one or more SIMD floating point units (FPU(s)) 634 to perform floating-point operations. In one embodiment, the FPU(s) 634 also support integer computation. In one embodiment the FPU(s) 634 can SIMD execute up to M number of 32-bit floating-point (or integer) operations, or SIMD execute up to 2M 16-bit integer or 16-bit floating-point operations. In one embodiment, at least one of the FPU(s) provides extended math capability to support high-throughput transcendental math functions and double precision 64-bit floating-point. In some embodiments, a set of 8-bit integer SIMD ALUs 635 are also present, and may be specifically optimized to perform operations associated with machine learning computations.

In one embodiment, arrays of multiple instances of the graphics execution unit 608 can be instantiated in a graphics sub-core grouping (e.g., a sub-slice). For scalability, product architects can chose the exact number of execution units per sub-core grouping. In one embodiment the execution unit 608 can execute instructions across a plurality of execution channels. In a further embodiment, each thread executed on the graphics execution unit 608 is executed on a different channel.

Figure 18:
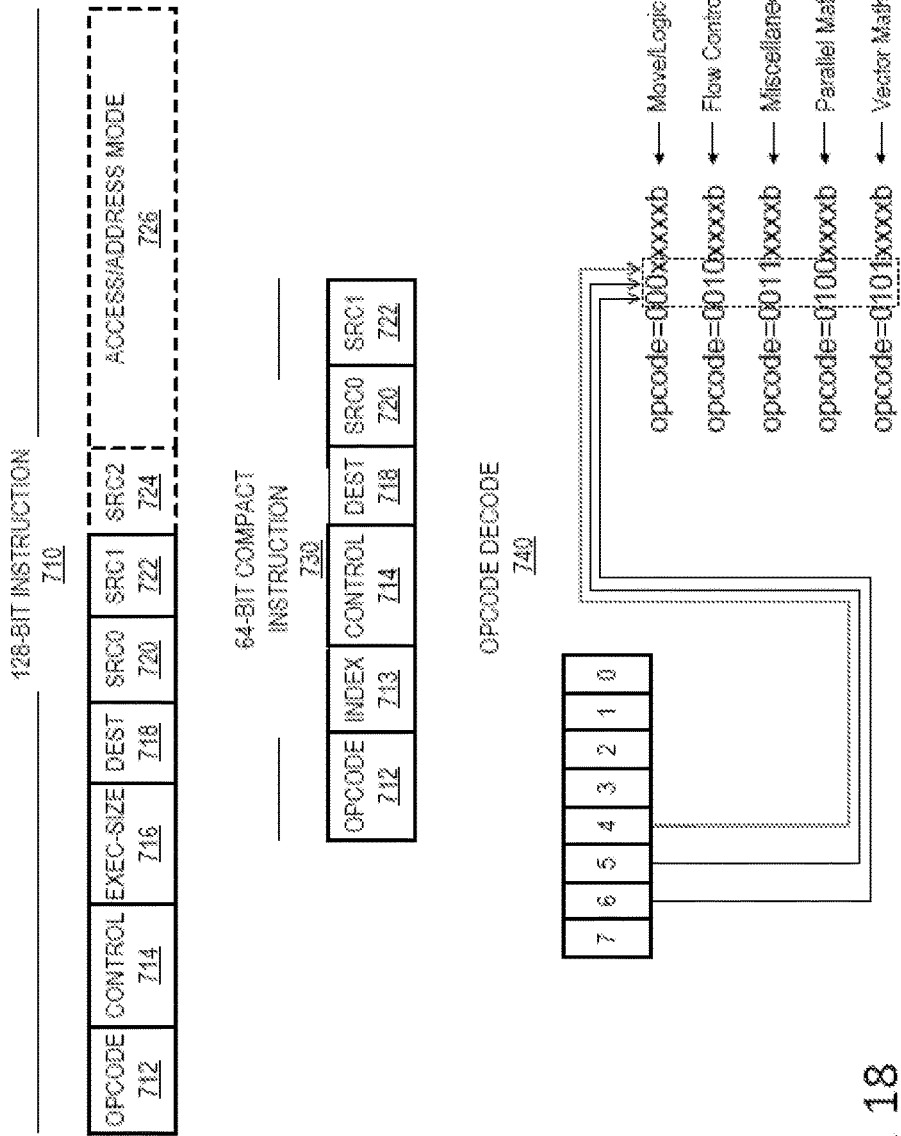
FIG. 18 is a block diagram illustrating an example of a graphics processor instruction formats according to an embodiment.

FIG. 18 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 19:
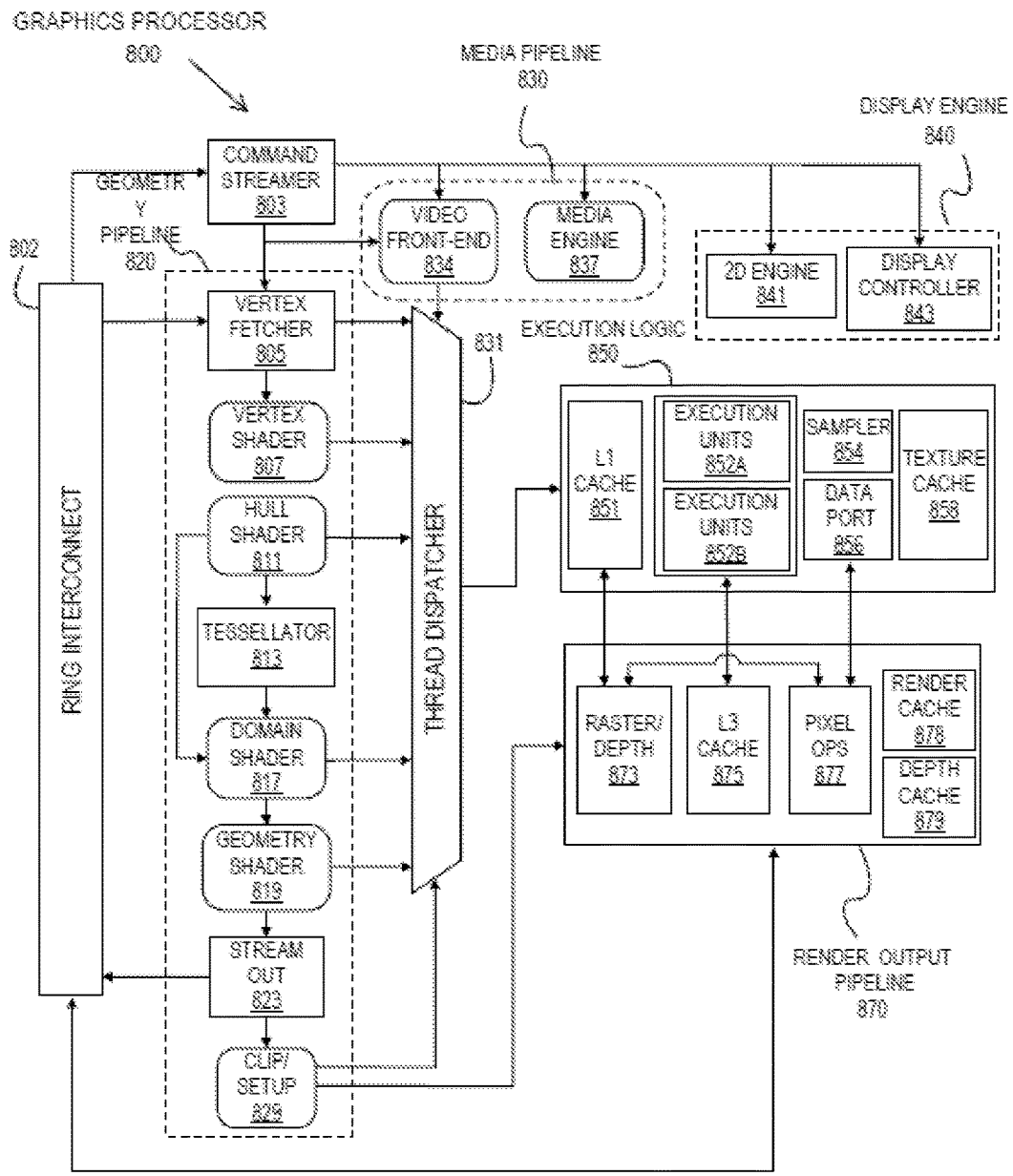
FIG. 19 is a block diagram of an example of a graphics processor according to an embodiment.

FIG. 19 is a block diagram of another embodiment of a graphics processor 800. Elements of FIG. 19 having the same reference numbers (or names) as the elements of any other figure herein can operate or function in any manner similar to that described elsewhere herein, but are not limited to such.

In some embodiments, graphics processor 800 includes a geometry pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of the geometry pipeline 820 or the media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A-852B via a thread dispatcher 831.

In some embodiments, execution units 852A-852B are an array of vector processors having an instruction set for performing graphics and media operations. In some embodiments, execution units 852A-852B have an attached L1 cache 851 that is specific for each array or shared between the arrays. The cache can be configured as a data cache, an instruction cache, or a single cache that is partitioned to contain data and instructions in different partitions.

In some embodiments, geometry pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to geometry pipeline 820. In some embodiments, if tessellation is not used, tessellation components (e.g., hull shader 811, tessellator 813, and domain shader 817) can be bypassed.

In some embodiments, complete geometric objects can be processed by a geometry shader 819 via one or more threads dispatched to execution units 852A-852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A-852B and associated logic units (e.g., L1 cache 851, sampler 854, texture cache 858, etc.) interconnect via a data port 856 to perform memory access and communicate with render output pipeline components of the processor. In some embodiments, sampler 854, caches 851, 858 and execution units 852A-852B each have separate memory access paths. In one embodiment the texture cache 858 can also be configured as a sampler cache.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front-end 834. In some embodiments, video front-end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, the geometry pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 20A is a block diagram illustrating a graphics processor command format 900 according to some embodiments. FIG. 20B is a block diagram illustrating a graphics processor command sequence 910 according to an embodiment. The solid lined boxes in FIG. 20A illustrate the components that are generally included in a graphics command while the dashed lines include components that are optional or that are only included in a sub-set of the graphics commands. The exemplary graphics processor command format 900 of FIG. 20A includes data fields to identify a client 902, a command operation code (opcode) 904, and data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 20B illustrates an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 21:
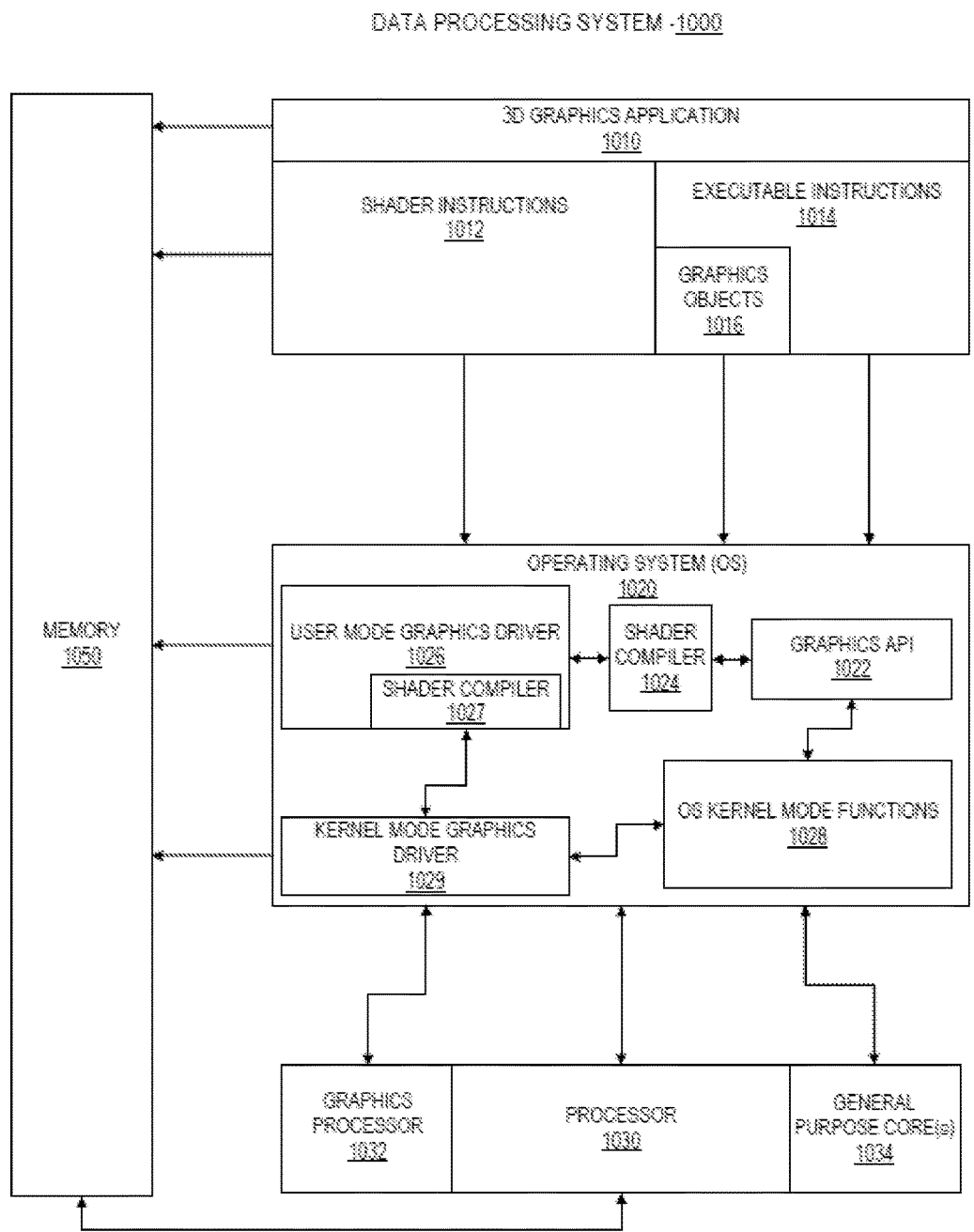
FIG. 21 is a block diagram of an example of a graphics software architecture according to an embodiment.

FIG. 21 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 22A:
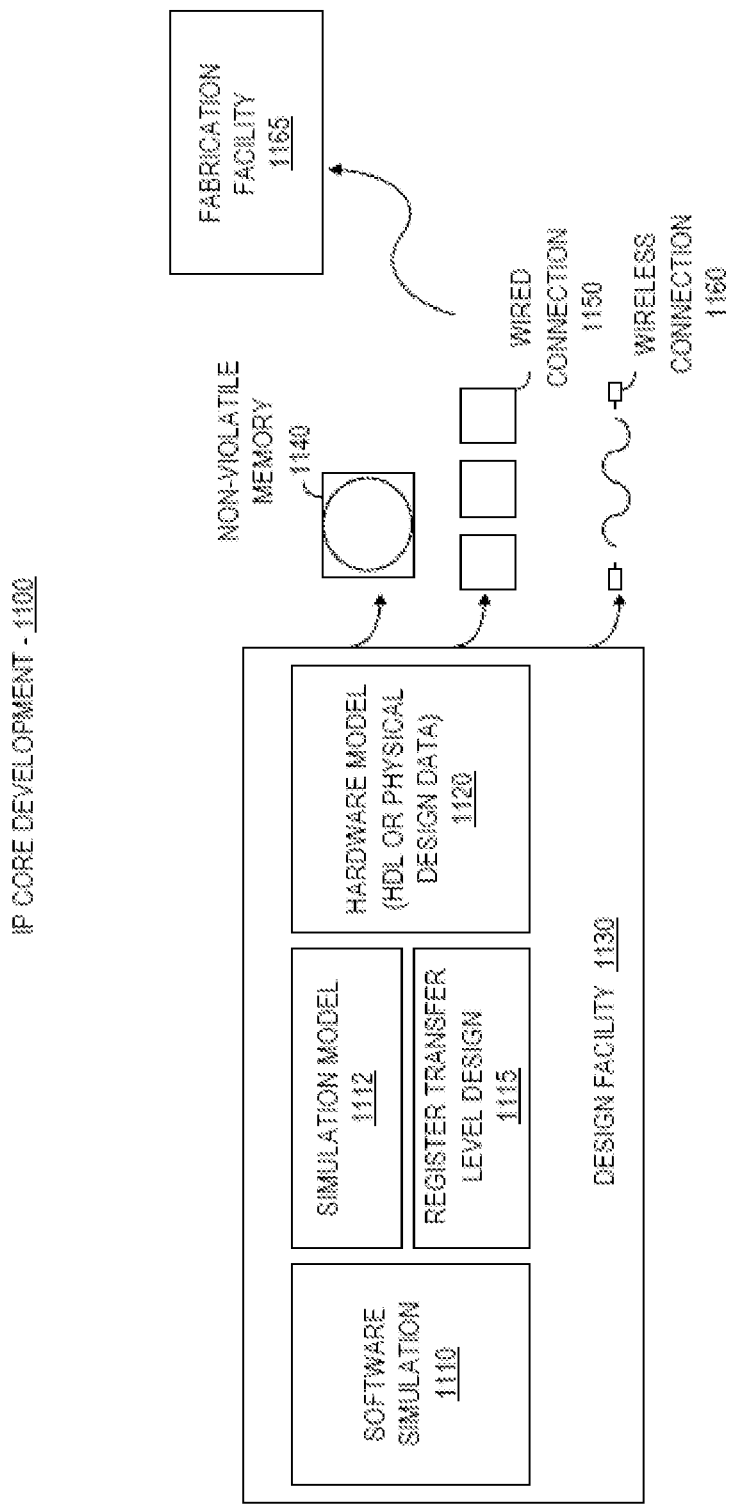
FIG. 22A is a block diagram of an example of an intellectual property (IP) core development system according to an embodiment.

FIG. 22A is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high-level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 22B:
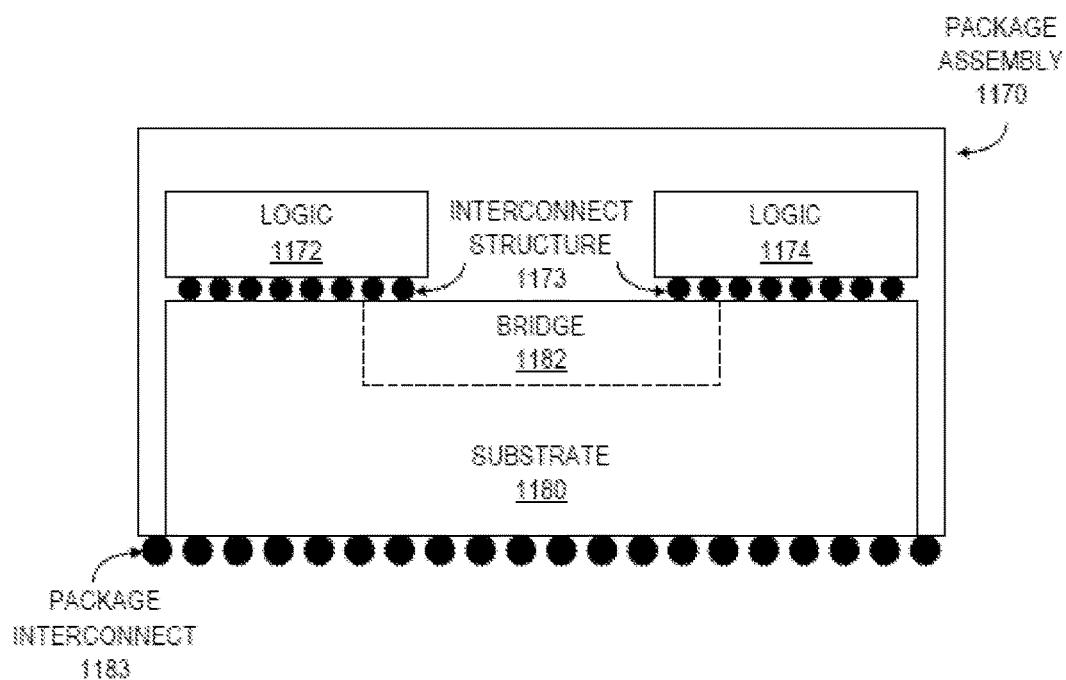
FIG. 22B is a block diagram of an example of an integrated circuit package according to an embodiment.

FIG. 22B illustrates a cross-section side view of an integrated circuit package assembly 1170, according to some embodiments described herein. The integrated circuit package assembly 1170 illustrates an implementation of one or more processor or accelerator devices as described herein. The package assembly 1170 includes multiple units of hardware logic 1172, 1174 connected to a substrate 1180. The logic 1172, 1174 may be implemented at least partly in configurable logic or fixed-functionality logic hardware, and can include one or more portions of any of the processor core(s), graphics processor(s), or other accelerator devices described herein. Each unit of logic 1172, 1174 can be implemented within a semiconductor die and coupled with the substrate 1180 via an interconnect structure 1173. The interconnect structure 1173 may be configured to route electrical signals between the logic 1172, 1174 and the substrate 1180, and can include interconnects such as, but not limited to bumps or pillars. In some embodiments, the interconnect structure 1173 may be configured to route electrical signals such as, for example, input/output (I/O) signals and/or power or ground signals associated with the operation of the logic 1172, 1174. In some embodiments, the substrate 1180 is an epoxy-based laminate substrate. The package substrate 1180 may include other suitable types of substrates in other embodiments. The package assembly 1170 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some embodiments, the units of logic 1172, 1174 are electrically coupled with a bridge 1182 that is configured to route electrical signals between the logic 1172, 1174. The bridge 1182 may be a dense interconnect structure that provides a route for electrical signals. The bridge 1182 may include a bridge substrate composed of glass or a suitable semiconductor material. Electrical routing features can be formed on the bridge substrate to provide a chip-to-chip connection between the logic 1172, 1174.

Although two units of logic 1172, 1174 and a bridge 1182 are illustrated, embodiments described herein may include more or fewer logic units on one or more dies. The one or more dies may be connected by zero or more bridges, as the bridge 1182 may be excluded when the logic is included on a single die. Alternatively, multiple dies or units of logic can be connected by one or more bridges. Additionally, multiple logic units, dies, and bridges can be connected together in other possible configurations, including three-dimensional configurations.

Exemplary System on a Chip Integrated Circuit

Figure 23:
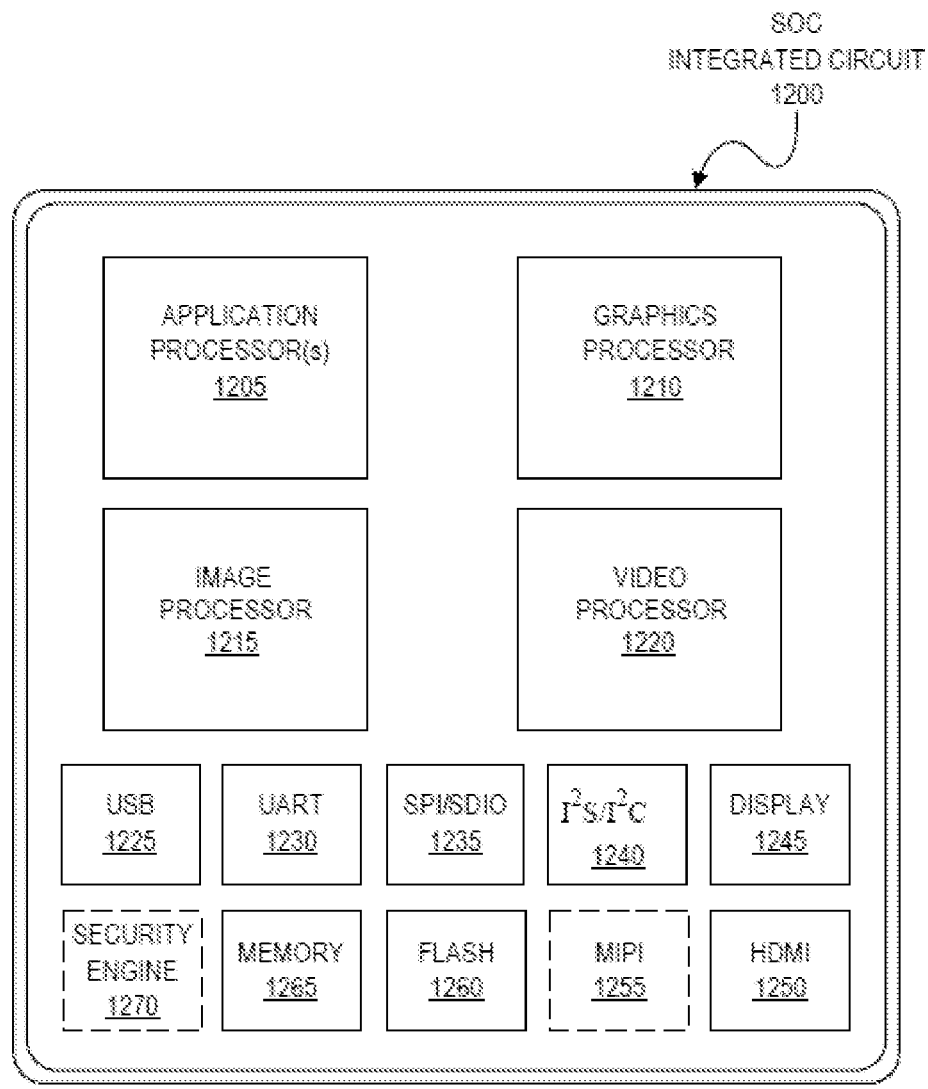
FIGS. 23-25B are block diagrams of examples of integrated circuits and associated graphics processors according to an embodiment.

FIGS. 23-25 illustrated exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general-purpose processor cores.

FIG. 23 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I²S/I²C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Figure 24A:
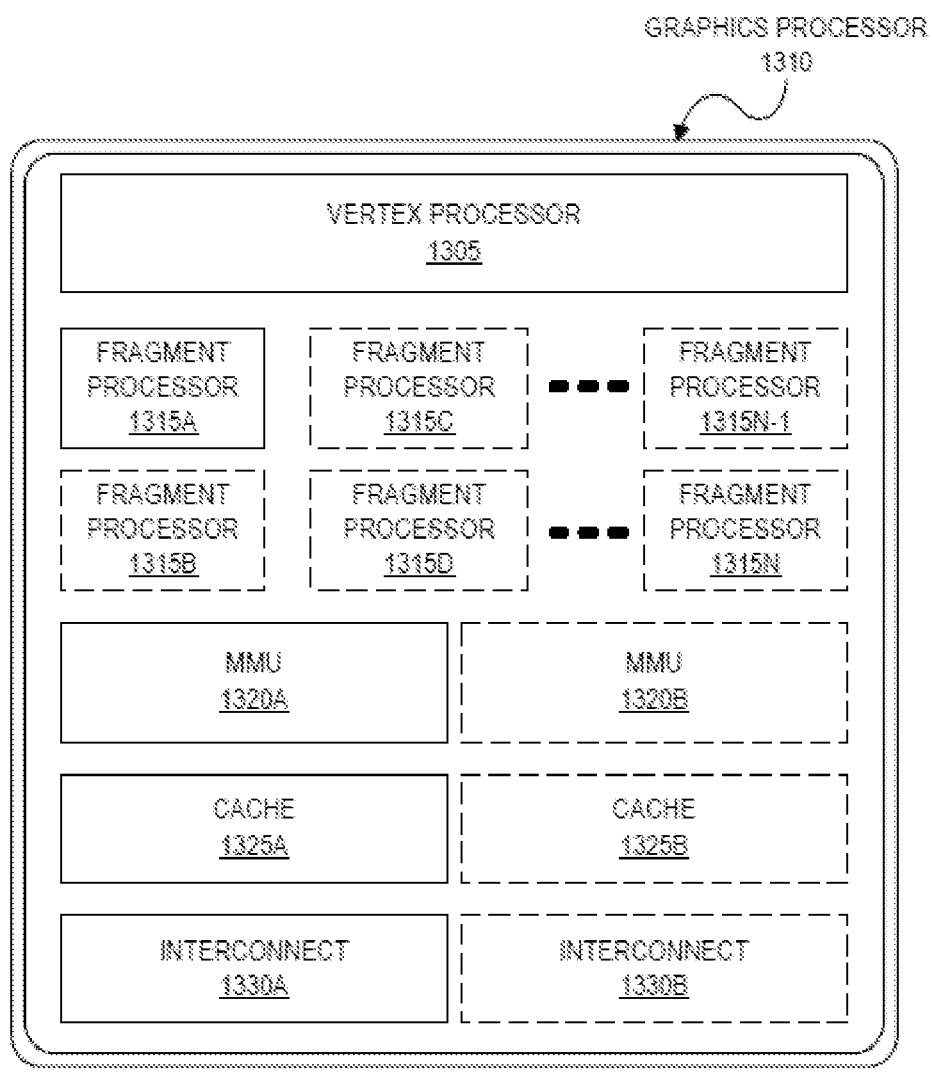
Figure 24B:
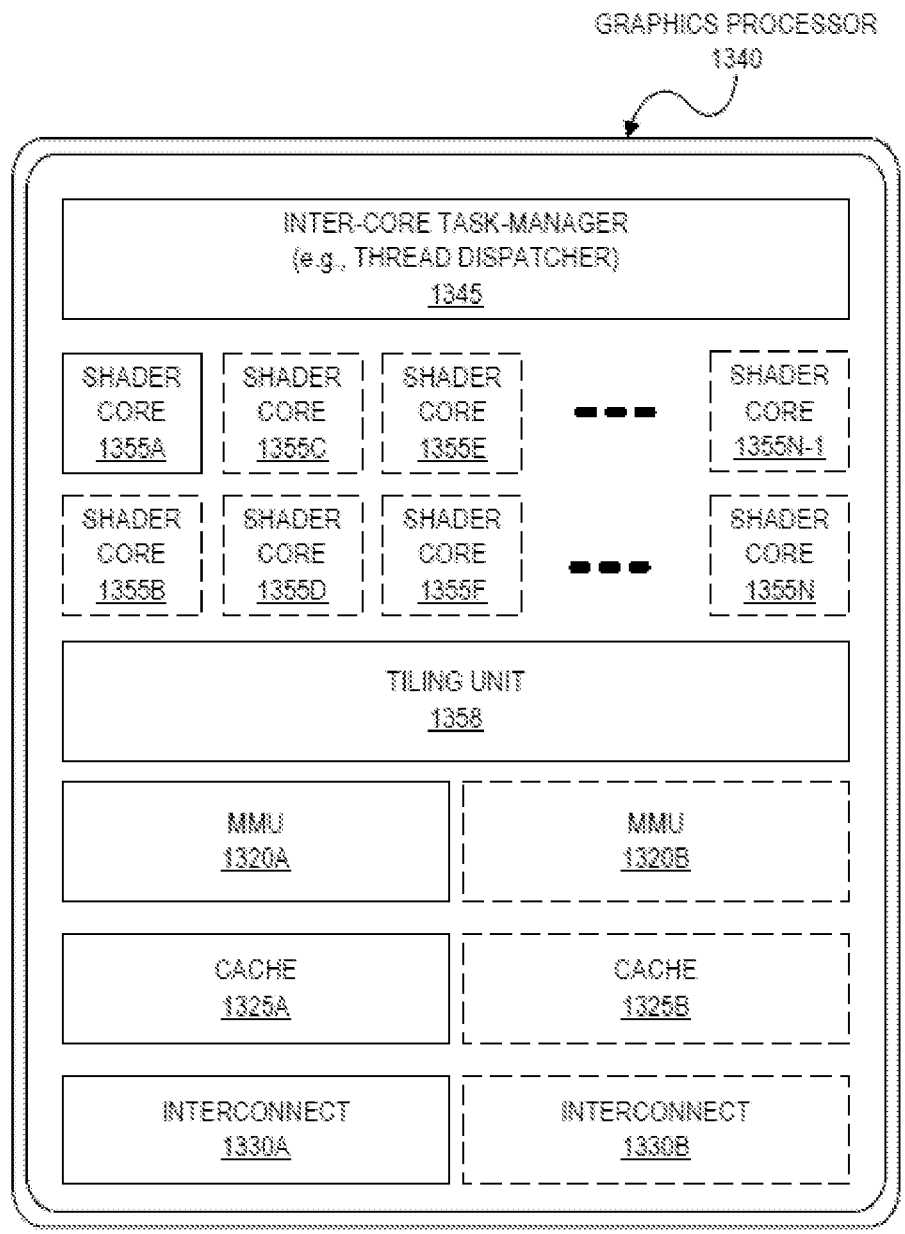

FIGS. 24A-24B are block diagrams illustrating exemplary graphics processors for use within an SoC, according to embodiments described herein. FIG. 24A illustrates an exemplary graphics processor 1310 of a system on a chip integrated circuit that may be fabricated using one or more IP cores, according to an embodiment. FIG. 24B illustrates an additional exemplary graphics processor 1340 of a system on a chip integrated circuit that may be fabricated using one or more IP cores, according to an embodiment. Graphics processor 1310 of FIG. 24A is an example of a low power graphics processor core. Graphics processor 1340 of FIG. 24B is an example of a higher performance graphics processor core. Each of the graphics processors 1310, 1340 can be variants of the graphics processor 1210 of FIG. 23.

As shown in FIG. 24A, graphics processor 1310 includes a vertex processor 1305 and one or more fragment processor(s) 1315A-1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for the graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 23, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

As shown FIG. 24B, graphics processor 1340 includes the one or more MMU(s) 1320A-1320B, caches 1325A-1325B, and circuit interconnects 1330A-1330B of the graphics processor 1310 of FIG. 24A. Graphics processor 1340 includes one or more shader core(s) 1355A-1355N (e.g., 1455A, 1355B, 1355C, 1355D, 1355E, 1355F, through 1355N-1, and 1355N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1340 includes an inter-core task manager 1345, which acts as a thread dispatcher to dispatch execution threads to one or more shader cores 1355A-1355N and a tiling unit 1358 to accelerate tiling operations for tile-based rendering, in which rendering operations for a scene are subdivided in image space, for example to exploit local spatial coherence within a scene or to optimize use of internal caches.

Figure 25A:
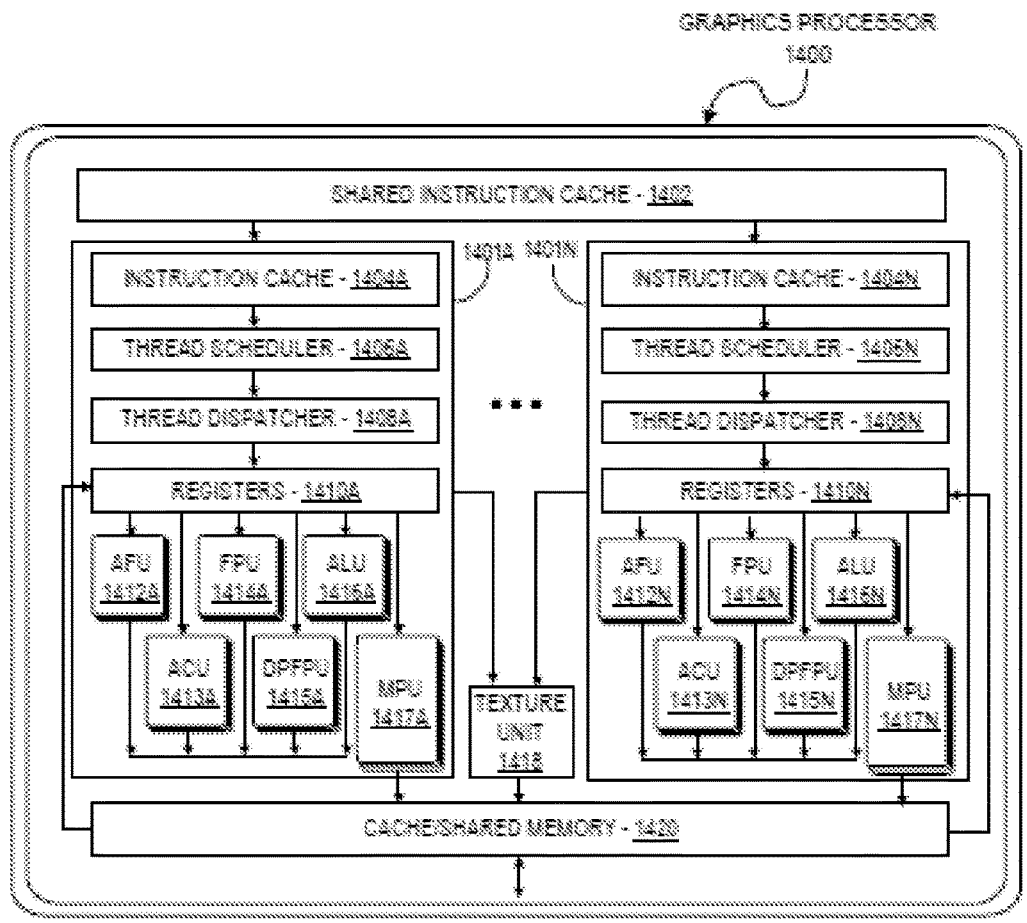
Figure 25B:
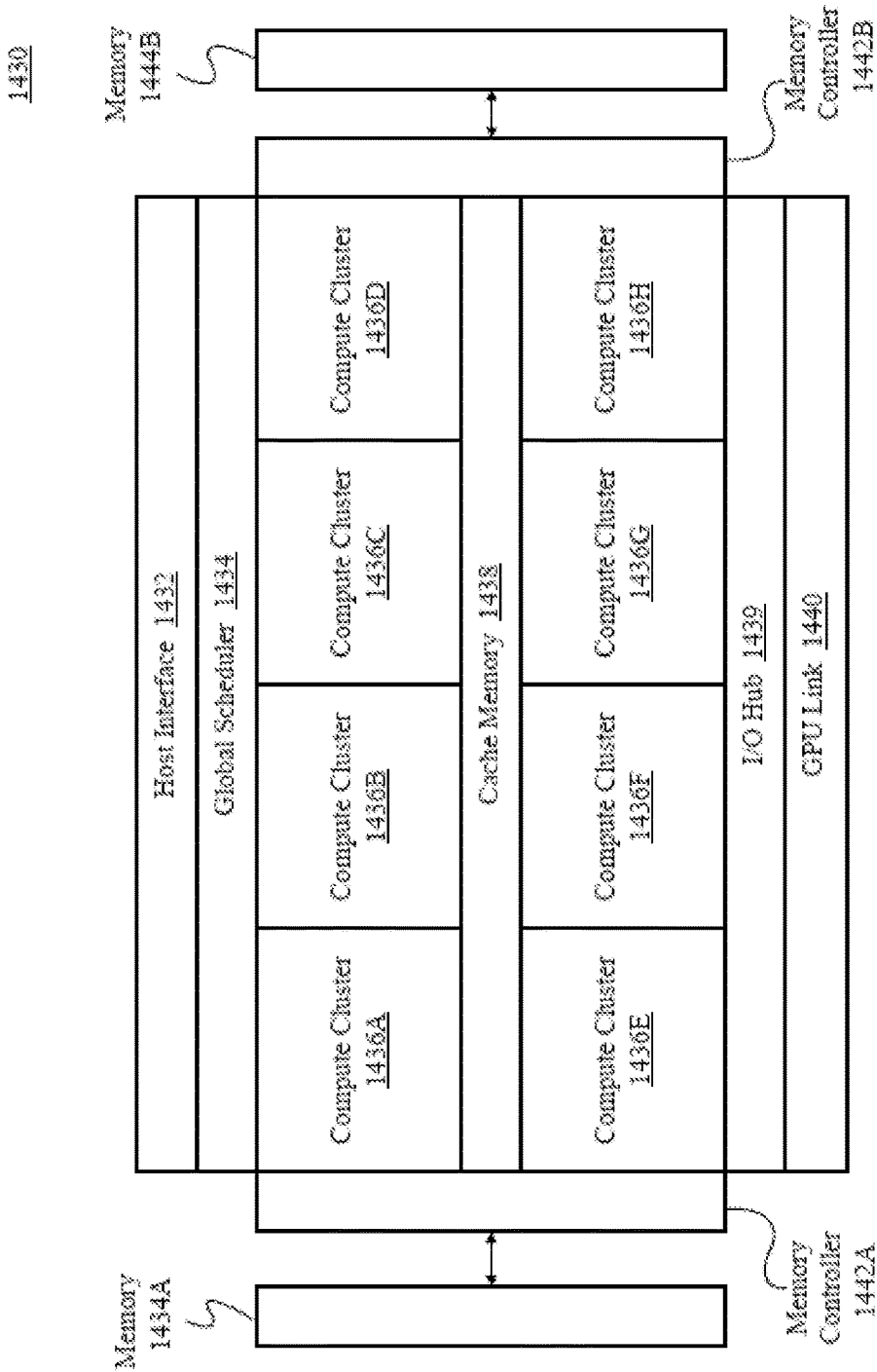

FIGS. 25A-25B illustrate additional exemplary graphics processor logic according to embodiments described herein. FIG. 25A illustrates a graphics core 1400 that may be included within the graphics processor 1210 of FIG. 23, and may be a unified shader core 1355A-1355N as in FIG. 24B. FIG. 25B illustrates a highly-parallel general-purpose graphics processing unit 1430 suitable for deployment on a multi-chip module.

As shown in FIG. 25A, the graphics core 1400 includes a shared instruction cache 1402, a texture unit 1418, and a cache/shared memory 1420 that are common to the execution resources within the graphics core 1400. The graphics core 1400 can include multiple slices 1401A-1401N or partition for each core, and a graphics processor can include multiple instances of the graphics core 1400. The slices 1401A-1401N can include support logic including a local instruction cache 1404A-1404N, a thread scheduler 1406A-1406N, a thread dispatcher 1408A-1408N, and a set of registers 1410A. To perform logic operations, the slices 1401A-1401N can include a set of additional function units (AFUs 1412A-1412N), floating-point units (FPU 1414A-1414N), integer arithmetic logic units (ALUs 1416-1416N), address computational units (ACU 1413A-1413N), double-precision floating-point units (DPFPU 1415A-1415N), and matrix processing units (MPU 1417A-1417N).

Some of the computational units operate at a specific precision. For example, the FPUs 1414A-1414N can perform single-precision (32-bit) and half-precision (16-bit) floating point operations, while the DPFPUs 1415A-1415N perform double precision (64-bit) floating point operations. The ALUs 1416A-1416N can perform variable precision integer operations at 8-bit, 16-bit, and 32-bit precision, and can be configured for mixed precision operations. The MPUs 1417A-1417N can also be configured for mixed precision matrix operations, including half-precision floating point and 8-bit integer operations. The MPUs 1417-1417N can perform a variety of matrix operations to accelerate machine learning application frameworks, including enabling support for accelerated general matrix to matrix multiplication (GEMM). The AFUs 1412A-1412N can perform additional logic operations not supported by the floating-point or integer units, including trigonometric operations (e.g., Sine, Cosine, etc.).

As shown in FIG. 25B, a general-purpose processing unit (GPGPU) 1430 can be configured to enable highly-parallel compute operations to be performed by an array of graphics processing units. Additionally, the GPGPU 1430 can be linked directly to other instances of the GPGPU to create a multi-GPU cluster to improve training speed for particularly deep neural networks. The GPGPU 1430 includes a host interface 1432 to enable a connection with a host processor. In one embodiment the host interface 1432 is a PCI Express interface. However, the host interface can also be a vendor specific communications interface or communications fabric. The GPGPU 1430 receives commands from the host processor and uses a global scheduler 1434 to distribute execution threads associated with those commands to a set of compute clusters 1436A-1436H. The compute clusters 1436A-1436H share a cache memory 1438. The cache memory 1438 can serve as a higher-level cache for cache memories within the compute clusters 1436A-1436H.

The GPGPU 1430 includes memory 1434A-1434B coupled with the compute clusters 1436A-1436H via a set of memory controllers 1442A-1442B. In various embodiments, the memory 1434A-1434B can include various types of memory devices including dynamic random access memory (DRAM) or graphics random access memory, such as synchronous graphics random access memory (SGRAM), including graphics double data rate (GDDR) memory.

In one embodiment the compute clusters 1436A-1436H each include a set of graphics cores, such as the graphics core 1400 of FIG. 25A, which can include multiple types of integer and floating point logic units that can perform computational operations at a range of precisions including suited for machine learning computations. For example and in one embodiment at least a subset of the floating point units in each of the compute clusters 1436A-1436H can be configured to perform 16-bit or 32-bit floating point operations, while a different subset of the floating point units can be configured to perform 64-bit floating point operations.

Multiple instances of the GPGPU 1430 can be configured to operate as a compute cluster. The communication mechanism used by the compute cluster for synchronization and data exchange varies across embodiments. In one embodiment the multiple instances of the GPGPU 1430 communicate over the host interface 1432. In one embodiment the GPGPU 1430 includes an I/O hub 1439 that couples the GPGPU 1430 with a GPU link 1440 that enables a direct connection to other instances of the GPGPU. In one embodiment the GPU link 1440 is coupled to a dedicated GPU-to-GPU bridge that enables communication and synchronization between multiple instances of the GPGPU 1430. In one embodiment the GPU link 1440 couples with a high speed interconnect to transmit and receive data to other GPGPUs or parallel processors. In one embodiment the multiple instances of the GPGPU 1430 are located in separate data processing systems and communicate via a network device that is accessible via the host interface 1432. In one embodiment the GPU link 1440 can be configured to enable a connection to a host processor in addition to or as an alternative to the host interface 1432.

While the illustrated configuration of the GPGPU 1430 can be configured to train neural networks, one embodiment provides alternate configuration of the GPGPU 1430 that can be configured for deployment within a high performance or low power inferencing platform. In an inferencing configuration the GPGPU 1430 includes fewer of the compute clusters 1436A-1436H relative to the training configuration. Additionally, the memory technology associated with the memory 1434A-1434B may differ between inferencing and training configurations, with higher bandwidth memory technologies devoted to training configurations. In one embodiment the inferencing configuration of the GPGPU 1430 can support inferencing specific instructions. For example, an inferencing configuration can provide support for one or more 8-bit integer dot product instructions, which are commonly used during inferencing operations for deployed neural networks.

ADDITIONAL NOTES AND EXAMPLES

Example 1 may include a performance-enhanced computing system comprising an integrated graphics processor, and logic to, based upon information from a connected display device, form a determination whether to connect a discrete graphics processor or the integrated graphics processor to the connected display device, the information corresponding to whether the connected display device is to be driven by the integrated graphics processor or the discrete graphics processor.

Example 2 may include the system of example 1, wherein the determination is made during a boot sequence of the computing system, the computing system including the discrete graphics processor.

Example 3 may include the system of example 2, further comprising a multiplexer (MUX) electrically connected to the integrated graphics processor, the discrete graphics processor, and the connected display device, wherein the determination is to connect the discrete graphics processor to the connected display device, and further wherein after the boot sequence and based upon the determination, the logic is to control the MUX to electrically connect the discrete graphics processor to the connected display device.

Example 4 may include the system of any one of examples 1-3, wherein the logic includes a list of display devices to be driven by the discrete graphics processor, further wherein the logic is to detect the information from the connected display device, compare the information to the list, and if the comparison indicates that the information is in the list, make the determination that the discrete graphics processor is to be connected to the connected display device.

Example 5 may include the system of example 1, wherein the determination is to connect the discrete graphics processor to the connected display device, wherein the logic is to override the determination, and electrically connect the integrated graphics processor to the connected display device when the discrete graphics processor is determined to be unavailable.

Example 6 may include the system of example 1, wherein the logic is to determine that another connected display device is to be electrically connected to the discrete graphics processor based on a selection by a user.

Example 7 may include the system of example 1, further comprising a substrate, the logic being coupled to the substrate.

Example 8 may include a semiconductor package apparatus comprising logic implemented in one or more of configurable logic or fixed-functionality hardware logic, the logic to form, based on information from a connected display device, a determination whether to connect a discrete graphics processor or an integrated graphics processor to the connected display device, the information corresponding to whether the connected display device is to be driven by the integrated graphics processor or the discrete graphics processor.

Example 9 may include the apparatus of example 8, wherein the determination is to be made during a boot sequence of a computing system including the integrated graphics processor and the discrete graphics processor.

Example 10 may include the apparatus of example 9, wherein the determination is to connect the discrete graphics processor to the connected display device, and after the boot sequence and based upon the determination, the logic is to control a multiplexer, which is electrically connected to the discrete graphics processor, the integrated graphics processor, and the connected display device, to electrically connect the discrete graphics processor to the connected display device.

Example 11 may include the apparatus of any one of examples 8-10, wherein the logic includes a list of display devices to be driven by the discrete graphics processor, and wherein the logic is to detect the information from the connected display device, compare the information to the list, and make, if the comparison indicates that the information is in the list, the determination that the discrete graphics processor is to be connected to the connected display device.

Example 12 may include the apparatus of example 8, wherein the determination is to connect the discrete graphics processor to the connected display device, and wherein the logic is to override the determination, and electrically connect the integrated graphics processor to the connected display device when the discrete graphics processor is determined to be unavailable.

Example 13 may include the apparatus of example 8, wherein the logic is to determine that another connected display device is to be electrically connected to the discrete graphics processor based on a selection by a user.

Example 14 may include the apparatus of 8, further comprising a substrate, the logic being coupled to the substrate.

Example 15 may include a method of operating a semiconductor package apparatus, comprising forming, based upon information from a connected display device, a determination whether to connect a discrete graphics processor or an integrated graphics processor to the connected display device, the information corresponding to whether the connected display device is to be driven by the integrated graphics processor or the discrete graphics processor.

Example 16 may include the method of example 15, wherein the forming occurs during a boot sequence of a computing system including the integrated graphics processor and the discrete graphics processor.

Example 17 may include the method of example 16, wherein the determination is to connect the discrete graphics processor to the connected display device, the method further comprising after the boot sequence and based upon the determination, electrically connecting the discrete graphics processor to the connected display device.

Example 18 may include the method of any one of examples 15-17, further comprising detecting the information from the connected display device, wherein forming the determination includes comparing the information of the connected display device to a list, the list including display devices to be driven by the discrete graphics processor, and making, if the information is in the list, the determination that the discrete graphics processor is to be connected to the connected display device.

Example 19 may include the method of example 15, wherein the determination is to connect the discrete graphics processor to the connected display device, the method further comprising determining whether the discrete graphics processor is unavailable, and overriding the determination, and electrically connecting the integrated graphics processor to the connected display device when the discrete graphics processor is determined to be unavailable.

Example 20 may include the method of example 15, further comprising determining that another connected display device is to be electrically connected to the discrete graphics processor based on a selection by a user.

Example 21 may include the at least one computer readable storage medium comprising a set of instructions, which when executed by a computing device, cause the computing device to form a determination, based upon information from a connected display device, whether to connect a discrete graphics processor or an integrated graphics processor to the connected display device, wherein the information corresponds to whether the connected display device is to be driven by the integrated graphics processor or the discrete graphics processor.

Example 22 may include the at least one computer readable storage medium of example 21, wherein the instructions, when executed, cause the computing device to form the determination during a boot sequence of the computing device, further wherein the computing device includes the integrated graphics processor and the discrete graphics processor.

Example 23 may include the at least one computer readable storage medium of example 22, wherein the determination is to connect the discrete graphics processor to the connected display device, and the instructions, when executed, cause the computing device to after the boot sequence, electrically connect the discrete graphics processor to the connected display device.

Example 24 may include the at least one computer readable storage medium of any one of examples 21-23, wherein the instructions, when executed, cause the computing device to detect the information from the connected display device, compare the information of the connected display device to a list, the list including display devices to be driven by the discrete graphics processor, and if the information is in the list, make the determination that the discrete graphics processor is to be connected to the connected display device.

Example 25 may include the at least one computer readable storage medium of example 21, wherein the determination is to connect the discrete graphics processor to the connected display device, further wherein the instructions, when executed, cause the computing device to determine whether the discrete graphics processor is unavailable, and override the determination, and electrically connect the integrated graphics processor to the connected display device when the discrete graphics processor is determined to be unavailable.

Example 26 may include the at least one computer readable storage medium of example 21, wherein the instructions, when executed, cause the computing device to determine that another connected display device is to be electrically connected to the discrete graphics processor based on a selection by a user.

Example 27 may include a switching apparatus comprising means for forming, based upon information from a connected display device, a determination whether to connect a discrete graphics processor or an integrated graphics processor to the connected display device, the information corresponding to whether the connected display device is to be driven by the integrated graphics processor or the discrete graphics processor.

Example 28 may include the apparatus of example 27, wherein the means for forming makes the determination during a boot sequence of a computing system including the integrated graphics processor and the discrete graphics processor.

Example 29 may include the apparatus of example 28, wherein the determination is to connect the discrete graphics processor to the connected display device, the apparatus further comprising means for, after the boot sequence and based upon the determination, electrically connecting the discrete graphics processor to the connected display device.

Example 30 may include the apparatus of any one of examples 27-29, further comprising means for detecting the information from the connected display device, and the means for forming includes means for comparing the information of the connected display device to a list, the list including display devices to be driven by the discrete graphics processor, and means for, if the information is in the list, making the determination that the discrete graphics processor is to be connected to the connected display device.

Example 31 may include the apparatus of example 27, wherein the determination is to connect the discrete graphics processor to the connected display device, the apparatus further comprising means for determining whether the discrete graphics processor is unavailable, and means for overriding the determination, and electrically connecting the integrated graphics processor to the connected display device when the discrete graphics processor is determined to be unavailable.

Example 32 may include the apparatus of example 27, further comprising means for determining that another connected display device is to be electrically connected to the discrete graphics processor based on a selection by a user.

Technology described herein may therefore enable a better VR experience in which users are able to read text more easily. Indeed, the technology may improve operation of the HMD system so that the entire scene may be rendered in a sharper fashion.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated. Additionally, it is understood that the indefinite articles "a" or "an" carries the meaning of "one or more" or "at least one".

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
an integrated graphics processor;
logic, implemented at least partly in one or more of configurable logic or fixed-functionality logic hardware, to:
based upon information from a connected display device, form a determination whether to connect a discrete graphics processor or the integrated graphics processor to the connected display device, the information corresponding to whether the connected display device is to be driven by the integrated graphics processor or the discrete graphics processor, wherein the determination is made during a boot sequence of the computing system,
in response to the determination being that the discrete graphics processor is to be connected to the display device,
defer enumeration of the display device until after the boot sequence, and
enumerate the display device with the discrete graphics processor in response to an identification, after the boot sequence, that the discrete graphics processor is available, and
in response to the determination being that the integrated graphics processor is to be connected to the display device, connect the integrated graphics processor to the display device to enumerate the display device during the boot sequence.

2. The system of claim 1, wherein the computing system includes the discrete graphics processor.

3. The system of claim 2, further comprising a multiplexer (MUX) electrically connected to the integrated graphics processor, the discrete graphics processor, and the connected display device,
wherein the determination is to connect the discrete graphics processor to the connected display device, and
further wherein after the boot sequence and based upon the determination, the logic is to control the MUX to electrically connect the discrete graphics processor to the connected display device.

4. The system of claim 1, wherein the logic includes a list of display devices to be driven by the discrete graphics processor,
further wherein the logic is to detect the information from the connected display device, compare the information to the list, and if the comparison indicates that the information is in the list, make the determination that the discrete graphics processor is to be connected to the connected display device.

5. The system of claim 1, wherein the determination is to connect the discrete graphics processor to the connected display device,
wherein the logic is to override the determination, and electrically connect the integrated graphics processor to the connected display device when the discrete graphics processor is determined to be unavailable.

6. The system of claim 1, wherein the logic is to determine that another connected display device is to be electrically connected to the discrete graphics processor based on a selection by a user.

7. The system of claim 1, further comprising a substrate, the logic being coupled to the substrate.

8. A semiconductor package apparatus comprising:
logic implemented in one or more of configurable logic or fixed-functionality logic hardware, the logic to:
form, based on information from a connected display device, a determination whether to connect a discrete graphics processor or an integrated graphics processor to the connected display device, the information corresponding to whether the connected display device is to be driven by the integrated graphics processor or the discrete graphics processor, wherein the determination is made during a boot sequence of a computing system;
in response to the determination being that the discrete graphics processor is to be connected to the display device,
defer enumeration of the display device until after the boot sequence, and
enumerate the display device with the discrete graphics processor in response to an identification, after the boot sequence, that the discrete graphics processor is available; and
in response to the determination being that the integrated graphics processor is to be connected to the display device, connect the integrated graphics processor to the display device to enumerate the display device during the boot sequence.

9. The apparatus of claim 8, wherein the computing system includes the integrated graphics processor and the discrete graphics processor.

10. The apparatus of claim 9, wherein the determination is to connect the discrete graphics processor to the connected display device, and after the boot sequence and based upon the determination, the logic is to control a multiplexer, which is electrically connected to the discrete graphics processor, the integrated graphics processor, and the connected display device, to electrically connect the discrete graphics processor to the connected display device.

11. The apparatus of claim 8, wherein the logic includes a list of display devices to be driven by the discrete graphics processor, and wherein the logic is to:
detect the information from the connected display device,
compare the information to the list, and
make, if the comparison indicates that the information is in the list, the determination that the discrete graphics processor is to be connected to the connected display device.

12. The apparatus of claim 8, wherein the determination is to connect the discrete graphics processor to the connected display device, and wherein the logic is to override the determination, and electrically connect the integrated graphics processor to the connected display device when the discrete graphics processor is determined to be unavailable.

13. The apparatus of claim 8, wherein the logic is to determine that another connected display device is to be electrically connected to the discrete graphics processor based on a selection by a user.

14. The apparatus of claim 8, further comprising a substrate, the logic being coupled to the substrate.

15. A method of operating a semiconductor package apparatus, comprising:
forming, during a boot sequence of a computing system and based upon information from a connected display device, a determination whether to connect a discrete graphics processor or an integrated graphics processor to the connected display device, the information corresponding to whether the connected display device is to be driven by the integrated graphics processor or the discrete graphics processor;
in response to the determination being that the discrete graphics processor is to be connected to the display device,
deferring enumeration of the display device until after the boot sequence, and
enumerating the display device with the discrete graphics processor in response to an identification, after the boot sequence, that the discrete graphics processor is available; and
in response to the determination being that the integrated graphics processor is to be connected to the display device, connecting the integrated graphics processor to the display device to enumerate the display device during the boot sequence.

16. The method of claim 15, wherein the computing system includes the integrated graphics processor and the discrete graphics processor.

17. The method of claim 16, wherein the determination is to connect the discrete graphics processor to the connected display device,
the method further comprising after the boot sequence and based upon the determination, electrically connecting the discrete graphics processor to the connected display device.

18. The method of claim 15, further comprising:
detecting the information from the connected display device, wherein forming the determination includes:
comparing the information of the connected display device to a list, the list including display devices to be driven by the discrete graphics processor; and
making, if the information is in the list, the determination that the discrete graphics processor is to be connected to the connected display device.

19. The method of claim 15, wherein the determination is to connect the discrete graphics processor to the connected display device,
the method further comprising:
determining whether the discrete graphics processor is unavailable; and
overriding the determination, and electrically connecting the integrated graphics processor to the connected display device when the discrete graphics processor is determined to be unavailable.

20. The method of claim 15, further comprising determining that another connected display device is to be electrically connected to the discrete graphics processor based on a selection by a user.

21. At least one non-transitory computer readable storage medium comprising a set of instructions, which when executed by a computing device, cause the computing device to:
- form a determination, based upon information from a connected display device, whether to connect a discrete graphics processor or an integrated graphics processor to the connected display device, wherein the information corresponds to whether the connected display device is to be driven by the integrated graphics processor or the discrete graphics processor, wherein the determination is made during a boot sequence of the computing device;
- in response to the determination being that the discrete graphics processor is to be connected to the display device,
  - defer enumeration of the display device until after the boot sequence, and
  - enumerate the display device with the discrete graphics processor in response to an identification, after the boot sequence, that the discrete graphics processor is available; and
- in response to the determination being that the integrated graphics processor is to be connected to the display device, connect the integrated graphics processor to the display device to enumerate the display device during the boot sequence.

22. The at least one non-transitory computer readable storage medium of claim 21, wherein the computing device includes the integrated graphics processor and the discrete graphics processor.

23. The at least non-transitory one computer readable storage medium of claim 22, wherein the determination is to connect the discrete graphics processor to the connected display device, and the instructions, when executed, cause the computing device to:
- after the boot sequence, electrically connect the discrete graphics processor to the connected display device.

24. The at least one non-transitory computer readable storage medium of claim 21, wherein the instructions, when executed, cause the computing device to:
- detect the information from the connected display device;
- compare the information of the connected display device to a list, the list including display devices to be driven by the discrete graphics processor; and
- if the information is in the list, make the determination that the discrete graphics processor is to be connected to the connected display device.

25. The at least one non-transitory computer readable storage medium of claim 21, wherein the determination is to connect the discrete graphics processor to the connected display device,
- further wherein the instructions, when executed, cause the computing device to:
- determine whether the discrete graphics processor is unavailable; and
- override the determination, and electrically connect the integrated graphics processor to the connected display device when the discrete graphics processor is determined to be unavailable.

26. The at least one non-transitory computer readable storage medium of claim 21, wherein the instructions, when executed, cause the computing device to:
- determine that another connected display device is to be electrically connected to the discrete graphics processor based on a selection by a user.

* * * * *